(12) United States Patent
Rajan et al.

(10) Patent No.: US 8,385,883 B2
(45) Date of Patent: Feb. 26, 2013

(54) APPARATUS AND METHODS FOR LOCATING, TRACKING AND/OR RECOVERING A WIRELESS COMMUNICATION DEVICE

(75) Inventors: Rajeev D. Rajan, San Diego, CA (US); Michal James Koenig, Encinitas, CA (US); Vera Kripalani, San Diego, CA (US); Kasim Mahmood, San Diego, CA (US); Jason Miller, San Diego, CA (US); Srinivas Patwari, San Diego, CA (US); Rajarshi Ray, San Diego, CA (US)

(73) Assignee: Qualcomm Incorporated, San Diego, CA (US)

( * ) Notice: Subject to any disclaimer, the term of this patent is extended or adjusted under 35 U.S.C. 154(b) by 700 days.

(21) Appl. No.: 11/831,435

(22) Filed: Jul. 31, 2007

(65) Prior Publication Data
US 2008/0186162 A1 Aug. 7, 2008

Related U.S. Application Data

(60) Provisional application No. 60/888,469, filed on Feb. 6, 2007.

(51) Int. Cl.
*H04M 1/66* (2006.01)
(52) U.S. Cl. ... 455/411; 340/5.31; 340/5.8; 340/539.13; 340/539.32; 455/456.1
(58) Field of Classification Search ............ 455/410, 455/411, 456.1, 456.2, 418, 419; 340/539.32, 340/539.13, 573.4, 5.2, 5.3, 5.31, 5.8, 5.81, 340/825.36, 825.49, 6.1, 8.1, 407.1, 691.1, 340/691.5
See application file for complete search history.

(56) References Cited

U.S. PATENT DOCUMENTS

| 6,662,023 | B1 * | 12/2003 | Helle | 455/558 |
| 7,783,281 | B1 | 8/2010 | Cook et al. | |
| 8,131,118 | B1 | 3/2012 | Jing et al. | |
| 2003/0135769 | A1 | 7/2003 | Loughran | |
| 2004/0180673 | A1 * | 9/2004 | Adams et al. | 455/456.2 |

(Continued)

FOREIGN PATENT DOCUMENTS

| EP | 1170969 A1 | 1/2002 |
| EP | 1684535 A1 | 7/2006 |

(Continued)

OTHER PUBLICATIONS

International Search Report and Written Opinion—PCT/US2008/052599, International Search Authority—European Patent Office—Jun. 20, 2008.

(Continued)

*Primary Examiner* — Thomas Mullen
(74) *Attorney, Agent, or Firm* — Abdollah Katbab

(57) ABSTRACT

Methods, systems, devices and computer program products are provided for locating, tracking and/or recovering a wireless communication device that has been misplaced, lost or stolen. In addition, the aspects provide for tracking or surveillance of the location or user in instances in which the wireless device has been loaned or is being used for covert surveillance. The aspects include communicating a locating state code to the targeted device, which detects the code and executes one or more routines that are associated with the respective code. In this regard, the targeted device is capable of carrying out different routines or sequences of actions depending on the state of the device, such as a misplaced state, a lost state, a stolen state or the like, which is based on the respective code.

112 Claims, 9 Drawing Sheets

U.S. PATENT DOCUMENTS

| | | | |
|---|---|---|---|
| 2004/0203601 A1* | 10/2004 | Morriss et al. | 455/411 |
| 2005/0181738 A1 | 8/2005 | Doyle et al. | |
| 2005/0221799 A1* | 10/2005 | Tervo et al. | 455/411 |
| 2005/0287994 A1* | 12/2005 | Serafat et al. | 455/414.1 |
| 2006/0031399 A1* | 2/2006 | Sherman et al. | 709/217 |
| 2006/0041591 A1 | 2/2006 | Rhoads | |
| 2006/0276175 A1 | 12/2006 | Chandran | |
| 2007/0294529 A1 | 12/2007 | Blair et al. | |
| 2008/0132245 A1* | 6/2008 | Snow et al. | 455/456.1 |
| 2008/0152232 A1 | 6/2008 | Skans | |
| 2008/0153551 A1 | 6/2008 | Baek et al. | |
| 2009/0075629 A1 | 3/2009 | Simpson et al. | |
| 2009/0253410 A1 | 10/2009 | Fitzgerald et al. | |
| 2009/0298469 A1 | 12/2009 | Kim et al. | |
| 2010/0210240 A1 | 8/2010 | Mahaffey et al. | |
| 2010/0273452 A1 | 10/2010 | Rajann et al. | |

FOREIGN PATENT DOCUMENTS

| | | | |
|---|---|---|---|
| JP | 11308318 A | | 11/1999 |
| JP | 2002077372 A | | 3/2002 |
| JP | 2003284154 A | | 10/2003 |
| JP | 2004112126 A | | 4/2004 |
| JP | 2005333501 A | | 12/2005 |
| JP | 2006019873 A | | 1/2006 |
| JP | 2006211377 A | | 8/2006 |
| JP | 2006302099 | | 11/2006 |
| JP | 2007028370 A | | 2/2007 |
| WO | WO9949331 A1 | | 9/1999 |
| WO | WO2005015932 | | 2/2005 |

OTHER PUBLICATIONS

Sprite Software: "Sprite Terminator User Guide" Dec. 6, 2007, XP002591339 Retrieved from the Internet: URL:http://www.spritesoftware.com/getmedia/4d21ad24-fd62-4c5e-a4fe-15ebc99aac9a/SpriteTerminator.aspx [retrieved on Jul. 9, 2010] p. 5-p. 32.

Taiwan Search Report—TW097104267—TIPO—Dec. 19, 2011.

* cited by examiner

APPARATUS AND METHODS FOR LOCATING, TRACKING AND/OR RECOVERING A WIRELESS COMMUNICATION DEVICE

CLAIM OF PRIORITY UNDER 35 U.S.C. §119

The present application for patent claims priority to Provisional Application No. 60/888,469 entitled "Apparatus and Methods for Detecting, Tracking and Recovering Stolen or Lost Mobile Devices" filed Feb. 6, 2007, and assigned to the assignee hereof and hereby expressly incorporated by reference herein.

BACKGROUND

1. Field

The disclosed aspects relate to wireless communication devices, and more particularly, to systems, methods and apparatus for locating and/or tracking and/or recovering a wireless communication device, especially devices that have been lost, stolen or misplaced.

2. Background

Wireless communication devices have become a prevalent means by which majorities of people worldwide have come to communicate. Wireless communication devices have become smaller and more powerful in order to meet consumer needs and to improve portability and convenience. The smallness and portability of such devices make them highly susceptible to being misplaced, lost or stolen. As the user penetration within the general population increases to include younger aged and senior aged users, the likelihood for misplacing, losing or having a device stolen tends to increase.

While many wireless communication devices are configured to provide password security protection, the password is typically required at device power-up. Thus, if a device has been lost or stolen while the power is on, the finder or the thief can use it as long as the device remains on. In many other instances, users prefer to forego password security protection because logging on each time the device is powered up is viewed as tedious and unnecessary action.

When the user of the wireless communication device is confronted with a situation in which the device is misplaced, lost or stolen, it provides for a troublesome and at times, traumatic experience. The wireless communication device, such as a mobile telephone, is no longer limited to providing a means for placing and receiving communication calls. The increased storage capacity and functionality of the devices may provide the user e-wallet or mobile-office functionality, which allows the user to not only store contact information but also credit card information, valuable and secured personal and business related information and the like. Thus, permanently losing a device and having to replace a lost or stolen device is not merely a matter of just facing the economical burden of purchasing a new device, it may also involve attempting to reacquire lost data, changing previous secure personal and/or business information cancelling credit cards and the like.

Users confronted with a misplaced, stolen or lost wireless communication device typically perform one or more standard operations, such as searching for the device, reporting to the authorities that the device has been stolen, contacting the service provider to get services turned off and, if the device is permanently lost or stolen, purchasing a new device. All of these standard options are less than attractive to the user, as they require time, effort, cost and induce stress. In the case of a misplaced device, which is reported as lost for the purpose of disconnecting services and is then subsequently found, the user has to perform the tedious and time-consuming process of re-contacting the service provider to have the service reinstated.

Regardless of whether the wireless communication device is misplaced, lost or stolen it is critical that the device be rendered unusable, either temporarily until the device is found or returned, or permanently if the device is stolen, not found or not returned.

In other situations in which a user loans their device to some one else, such as a parent loaning their device to their child, a need may exist to track the location of the device and/or the corresponding loanee. In another application, it may be advantageous to provide a user a wireless communication device and nefariously track the location of the user or the user's actions. For example, a law enforcement agency may desire to track the whereabouts or actions of a suspected criminal, without the suspected criminal knowing that they are being tracked or their actions being monitored.

Thus a need exists to provide for locating, tracking and/or recovering wireless communication devices that have been misplaced lost, or stolen. As such a need exists to provide disablement and secure the data stored on a wireless communication device that is misplaced, lost or stolen. Additionally, a need also exists, for providing location and action tracking of wireless devices in the instance in which the device has been loaned or to provide covert surveillance by law enforcement of suspected criminals.

SUMMARY

Present aspects provide for methods, devices, systems and computer program products for locating, tracking, securing and/or recovering wireless communication devices that have been misplaced, lost or stolen. In this regard, present aspects rely on generating a communication data packet, for example, a Short Message Service (SMS) communication data packet at a secondary wireless device, a web interface or a network service provider device. The communication data packet includes a locating state code that identifies one of a plurality of locating states that are operable on the targeted (i.e., the misplaced, lost or stolen) wireless communication device. The locating states are associated with one or more predetermined routines that are operable on the targeted wireless device. In some aspects, the locating state may be associated with a sequence of routines that are triggered on the device.

The predetermined routines may effectively disable/lock the wireless communication device, disable any application running on the wireless device, such as a communication call application. Additionally, the predetermined routines may trigger audible, visual or sensory perceptible alerts to the possessor of the device that identify the device as being lost or stolen. The predetermined routines may additionally capture data, such as geographic location data, image data, audio data and the like and communicate the data to the owner/user of the targeted device, to a network entity device, or to a service provider device. In turn the captured and retrieved information may be used to locate the device and/or the party who is in possession of the targeted device. Additionally, the predetermined routines that capture and communicate data may be operated in a "stealth" mode so that conventional indicators that would normally be presented, such as displayed lights or messages or audible tones, are suppressed to insure that the finder/thief is unaware that these routines are currently being executed.

One aspect is defined by method for locating a targeted wireless communication device. The method includes receiving, at the targeted wireless communication device, a communication data packet having a predetermined format. The communication data packet, such as a data call packet or voice call packet, may, in some aspects, take the form of a Short Message Service (SMS) communication data packet. The communication data packet includes a locating state code associated with one of a plurality of predetermined locating states in which the targeted wireless device is operable. Each locating state is stored in a memory on the targeted wireless device and includes one or more predetermined location routines carried out by the targeted wireless device. The method additionally includes executing at least one of the one or more predetermined location routines on the targeted wireless communication device in response to detecting the location state code in the communication data packet.

The method may additionally include communicating a result of the execution of at least the one or more predetermined routines to at least one of a network entity, a service provider and an owner/user of the targeted wireless communication device via a secondary wireless communication device or a web interface. In one aspect of the method receiving the communication packet may trigger the wireless device to perform a predetermined sequence of routines corresponding to the one of a plurality of locating states associated with the locating state code. The location states may include, but are not limited to, a misplaced state, a lost state, a stolen state, a tracking state, an emergency surveillance state and a covert surveillance state. The plurality of routines associated with the location states may, include but are not limited to, disabling a keypad, disabling a communication call, disabling the wireless device, disabling a specific application, determining a geographic position, capturing a still image, capturing a moving image, capturing audio, enabling a sensory alarm, deleting a first set of predetermined user data, retrieving a second set of predetermined user data, and locking access to a third set of user data.

An alternate related aspect is provided for by at least one processor configured for locating a targeted wireless communication device. The processor includes a first module for receiving, at the targeted wireless communication device, a communication data packet having a predetermined format. The data packet includes a locating state code associated with one of a plurality of predetermined locating states in which the targeted wireless device is operable. Each locating state is stored in a memory on the targeted wireless device and comprises one or more predetermined location routines carried out by the targeted wireless device. The processor additionally includes a second module for executing at least one of the one or more predetermined location routines on the targeted wireless communication device in response to detecting the location state code in the communication data packet.

Another related aspect is defined by a computer program product for locating a targeted wireless communication device that includes a computer-readable medium. The computer-readable medium includes a first set of codes for causing a computer to receive a communication data packet having a predetermined format. The communication data packet includes a locating state code associated with one of a plurality of predetermined locating states in which the targeted wireless device is operable. Each locating state is stored in a memory on the targeted wireless device and comprises one or more predetermined location routines carried out by the targeted wireless device. The computer-readable medium additionally includes a second set of codes for causing the computer to execute at least one of the one or more predetermined location routines on the targeted wireless communication device in response to detecting the location state code in the communication data packet.

A further related aspect is provided for by an apparatus that includes means for receiving, at the targeted wireless communication device, a communication data packet having a predetermined format. The communication data packet includes a locating state code associated with one of a plurality of predetermined locating states in which the targeted wireless device is operable. Each locating state is stored in a memory on the targeted wireless device and comprises one or more predetermined location routines carried out by the targeted wireless device. The apparatus additionally includes means for executing at least one of the one or more predetermined location routines on the targeted wireless communication device in response to detecting the location state code in the communication data packet.

Yet another aspect is defined by a wireless communication device. The device includes a computer platform including a processor and a memory. The device includes a communication module stored in the memory and executable by the processor. The communication module is operable to receive a communication data packet, such as a data call packet or voice call packet, having a predetermined format. In one aspect, the communication data packet may be a Short Message Service (SMS) communication data packet. The communication data packet includes a location state code that is associated with one of a plurality of predetermined locating states in which the wireless communication device is operable. The wireless communication device also includes a location/recovery module for assisting in determining a location or recovering of the wireless communication device. The location/recovery module stored in the memory and executable by the processor to operate the wireless communication device in at least one of a plurality of predetermined locating states. The location/recovery module further includes a plurality of location routines each corresponding to at least one of the plurality of locating states. The location/recovery module is operable to initiate execution of a predetermined one or more of the plurality of location routines based on recognition of the locating state code in the communication data packet.

In some aspects, the location/recovery module is further operable to communicate results of the execution of the predetermined one or more of the plurality of location routines to at least one of a network entity, service provider and a user of the targeted wireless communication device via a secondary wireless device and/or a web interface. In some aspects, the location/recovery module is further operable to trigger the wireless device to perform a predetermined sequence of routines corresponding to the one of a plurality of locating states associated with the locating state code. In some aspects, the location/recovery module is further operable to store an indicator value of the location state code in a non-volatile memory location on the targeted wireless device, checking the non-volatile memory location when, restoring power to the wireless device to determine the indicator value, and re-enabling the one of the plurality of predetermined locating states corresponding to the indicator value. The plurality of locating states may include, but are not limited to, a misplaced state, a lost state, a stolen state, a tracking state, an emergency surveillance state and a covert surveillance state. The plurality of location routines may include, but are not limited to, disabling a keypad, disabling a communication call, disabling the wireless device, disabling a specific application, determining a geographic position, capturing a still image, capturing a moving image, capturing audio, enabling a sensory alarm, deleting a first set of predetermined user data, retrieving a second set of predetermined user data, and locking access to a third set of user data.

Yet another aspect is defined by a method for locating a targeted wireless communication device. The method includes generating a communication data packet having a predetermined format. The communication data packet may correspond to a voice call packet or a data call packet. In one aspect the communication data packet may be a Short Message Service (SMS) data packet. The communication data packet includes a locating state code associated with one of a plurality of predetermined locating states in which a targeted wireless communication device is operable. Each locating state is associated with one or more predetermined routines operable on the targeted wireless communication device. The method also includes communicating the communication data packet to the targeted wireless communication device.

In some aspects, the method may include receiving results of execution of the one or more predetermined routines that are executed on the targeted wireless communication device in response to detecting the location state code in the communication data packet. In some aspects, generating a communication data packet that includes a locating state code associated with one of a plurality of locating states associated with a predetermined sequence of routines that trigger the targeted wireless communication device to perform the predetermined sequence of routines. In one aspect, in which the communication data packet is a SMS communication packet, the packet may include a payload having a location/recovery identifier operable to invoke location/recovery on the targeted wireless communication device, a personal identifier operable to identify the generating party as an authorized party, a code associated with one of the plurality of locating states and a variable length field operable to set parameters associated with the one or more predetermined routines.

A related aspect is provided for by at least one processor configured for locating a targeted wireless communication device. The processor includes a first module for generating a communication data packet having a predetermined format. The packet includes a locating state code associated with one of a plurality of predetermined locating states in which the targeted wireless communication device is operable. Each locating state is associated with one or more predetermined routines operable on the targeted wireless communication device. The processor includes a second module for communicating the communication data packet to the targeted wireless communication device.

A further related aspect is defined by a computer program product configured for locating a targeted wireless communication device. The computer program product includes a computer-readable medium. The medium includes a first set of codes for causing a computer to generate a communication data packet having a predetermined format. The packet includes a locating state code associated with one of a plurality of predetermined locating states in which a targeted wireless communication device is operable. Each locating state is associated with one or more predetermined routines operable on the targeted wireless communication device. The medium additionally includes a second set of codes for causing the computer to communicate the communication data packet to the targeted wireless communication device.

Another related aspect is provided for by an apparatus. The apparatus includes means for generating a communication data packet having a predetermined format. The packet includes a locating state code associated with one of a plurality of predetermined locating states in which a targeted wireless communication device is operable. Each locating state is associated with one or more predetermined routines operable on the targeted wireless communication device. The apparatus also includes means for communicating the communication data packet to the targeted wireless communication device.

Yet another aspect is defined by a communication device. The communication device may include a secondary wireless communication device, a network device, such as a web server and/or a service provider server, or any other device used to locate, track and/or recover a targeted wireless communication device. The device includes a computer platform including a processor and a memory. The device also includes a communication module stored in the memory and executable by the processor. The communication module is operable to generate a communication data packet having a predetermined format. The packet includes a locating state code associated with one of a plurality of predetermined locating states in which the targeted wireless communication device is operable. Each locating state is associated with one or more predetermined routines operable on the targeted wireless communication device. The communication module is also operable to wirelessly communicate the communication data packet to the targeted wireless communication device.

Thus, present aspects provide for methods, apparatus, devices, systems and computer program products for locating, tracking and/or recovering wireless communication devices that have been misplaced, lost or stolen. In addition, the aspects provide for tracking or surveillance of the location or user in instances in which the wireless device has been loaned or is being used for covert surveillance. The aspects rely on communicating a locating state code to the targeted device, which detects the code and executes one or more routines that are associated with the codes. In this regard, the targeted device is capable of carrying out different routines or sequences of routines depending on the state of the device, such as misplaced state, lost state, stolen state or the like.

BRIEF DESCRIPTION OF THE DRAWINGS

The disclosed aspects will hereinafter be described in conjunction with the appended drawings, provided to illustrate and not to limit the disclosed aspects, wherein like designations denote the elements, and in which.

DETAILED DESCRIPTION

Figure 1:
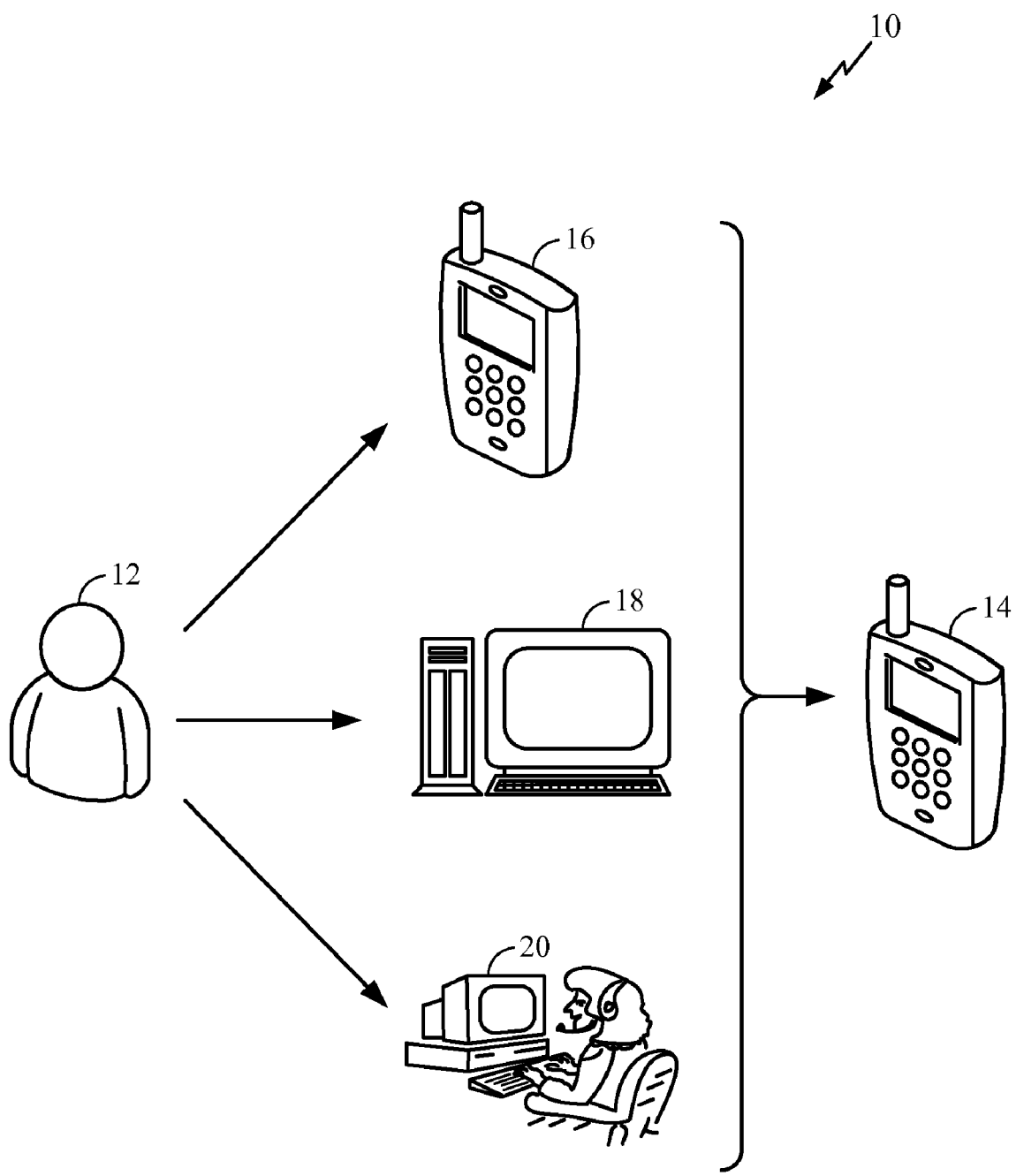
FIG. 1 is a block diagram of a system for remotely accessing a wireless communication device that has been misplaced, lost or stolen, according to an aspect.

The present devices, apparatus, methods, computer-readable media and processors now will be described more fully hereinafter with reference to the accompanying drawings, in which aspects of the invention are shown. The devices, apparatus, methods, computer-readable media and processors may, however, be embodied in many different forms and should not be construed as limited to the aspects set forth herein; rather, these aspects are provided so that this disclosure will be thorough and complete, and will fully convey the scope of the invention to those skilled in the art. Like numbers refer to like elements throughout.

The various aspects are described herein are in connection with a wireless communication device. A wireless communication device can also be called a subscriber station, a subscriber unit, mobile station, mobile, remote station, access point, remote terminal, access terminal, user terminal, user agent, a user device, or user equipment. A subscriber station may be a cellular telephone, a cordless telephone, a Session Initiation Protocol (SIP) phone, a wireless local loop (WLL) station, a personal digital assistant (PDA), a handheld device having wireless connection capability, or other processing device connected to a wireless modem.

Present aspects provide for systems, devices, apparatus, methods and computer program products for locating, tracking and attempting to recover, wireless communication devices that have been misplaced, lost or stolen. In this regard, present aspects rely on generating a communication data packet, for example, a Short Message Service (SMS) communication data packet at a secondary wireless device, a web interface or a network service provider device. The communication data packet includes a locating state code that identifies one of a plurality of locating states that are operable on the targeted (i.e., the misplaced, lost or stolen) wireless communication device. The locating states are associated with one or more predetermined routines that are operable on the targeted wireless device. In some aspects, the locating state may be associated with a sequence of routines that are triggered on the device.

The routines may effectively disable/lock the wireless communication device, and/or disable any application running on the wireless device, such as a communication call application. In addition to disabling or locking the device, the routines may trigger jamming or scrambling of communication signals, such as voice or data signals. Additionally, the routines may trigger audible, visual or sensory perceptible alerts to the possessor of the device that identify the device as being lost or stolen. The routines may additionally capture data, such as geographic location data, image data, audio data and the like and communicate the data to the owner/user of the targeted device, to a network entity device, or to a service provider device. In turn the captured and retrieved information may be used to locate the device and/or the party who is in possession of the targeted device. Also, once data is captured and retrieved from the wireless device, routines may provide for data to be removed/deleted from the device. Additionally, the routines that capture and communicate data may be operated in a "stealth" mode so that conventional indicators that would normally be presented, such as displayed lights or messages or audible tones, are suppressed to insure that the finder/thief is unaware that these routines are currently being executed. Also, the routines may change an operational mode, such as changing the targeted device from a "silent" or "vibrate" ring state to an "audible" ring state.

Referring to FIG. 1, a block diagram is depicted of a system 10 for remotely accessing a wireless communication device that has been misplaced, lost or stolen to initiate the locating, tracking and/or attempted recovery of present aspects. The user/owner 12 of the targeted wireless communication device 14, which may be categorized as misplaced device, a lost device, a stolen device or a device that requires tracking or surveillance, may remotely access the device 14 through various communication channels. The communication channels provide for generating and communicating a communication data packet, such as an SMS message or the like, which includes a locating state code for identifying one of a plurality of locating states (for example, a misplaced state, a lost state, a stolen state, a tracking state, a surveillance state, such as an emergency surveillance state or a covert surveillance state, and the like) that are operable on the targeted wireless communication device. As will be described at length infra., the locating states are associated with one or more predetermined location routines that are operable on the targeted wireless device. In many aspects, a locating state is associated with a predetermined sequence of routines or actions that are executed to locate, track, and attempt to recover the target device 14.

As shown in FIG. 1, the user/owner 12 may borrow or otherwise obtain an alternate or secondary wireless communication device 16 to generate and communicate the requisite communication data packet to the targeted device. In addition, the user/owner 12 may interface with a web interface through a PC 18, laptop (not shown in FIG. 1) or any other device having network access to the Internet. In such aspects, user/owner will provide necessary inputs to the web interface to initiate the generation and communication of the requisite communication data packet to the targeted device. In another aspect, user/owner 12 may communicate with a network/service provider entity 20 and the network/service provider entity may provide the necessary inputs to a network server to initiate the generation and communication of the requisite communication data packet to the targeted device. Alternatively, any other communication mechanism capable of generating and communicating the necessary communication data packet to the target device may also be used to initiate the location, tracking and attempted recovery process according to the present aspects.

Figure 2:
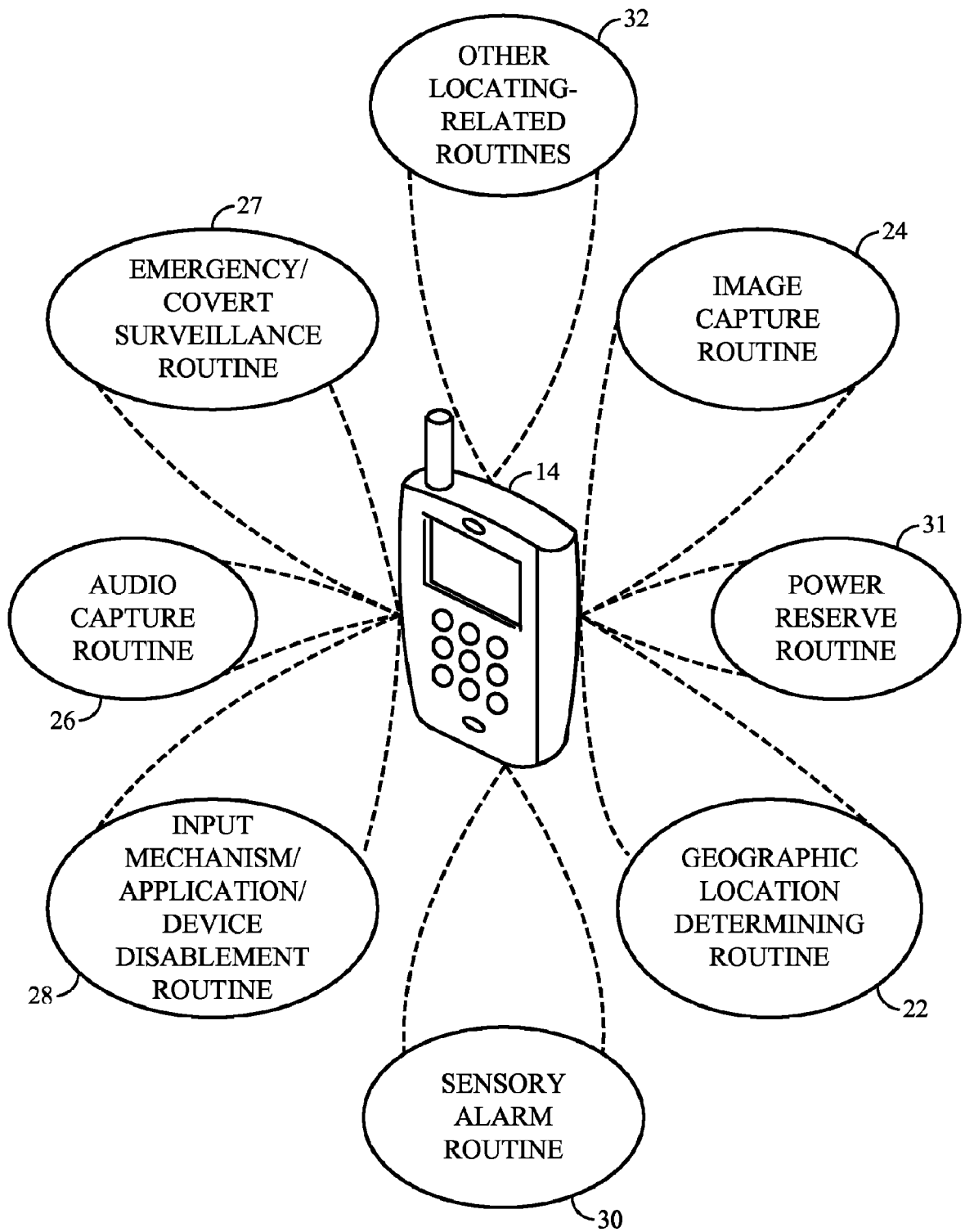
FIG. 2 is a block diagram of the various location and recovery routines executed by a wireless communication device that has been misplaced, lost or stolen, according to an aspect.

FIG. 2 provides a block diagram of various location routines that may be executed on the targeted wireless communication device 14 in response to detection of location state code in a received communication data packet. As previously noted, each location state will be associated with one or more location routines and, in some aspects, a location state will be associated with a sequence of location routines, such that detection of a location state code in a received communication data packet will trigger the execution of the sequence of location routines. As shown, in FIG. 2, the targeted wireless communication device may be operable to execute a geographic location determining routine 22, such as a Global Positioning System (GPS) location determining routine, a still or moving image capture routine 24 and/or an audio capture routine 26. The results of these routines, geographic location data, image data and/or audio data may then be communicated to back to the user/owner via the secondary device 16 and/or a web interface, a network entity, such as a service provider, a law enforcement entity and/or any other relevant entity for analysis. Geographic location data provides the ability to track the location of the misplaced, lost or stolen device. Image data, still or moving, and audio data may provide the ability to identify the finder/thief of the targeted device or identify the surrounding area in which the targeted device is located.

Additionally, target device 14 may be operable to execute emergency/covert surveillance routine 27 that provides surveillance of a location if an emergency event requiring surveillance occurs. For example, if a major accident occurs, such as an automobile accident, or a kidnapping/abduction occurs. The emergency/covert surveillance routine 27 may be operable to activate the still or moving image capture routine 24 to capture still or moving image data, the geographic location-determining routine 22 for determining location, the audio capture routine 26 for capturing audio and the like. Additionally, as shown in FIG. 2, the targeted device 14 may be operable to execute input mechanism, application and/or device disablement routine 28 that may operable to disable any input mechanism, such as the keypad, any application executable on the device, such as communication call applications or disable the device in its entirety. The targeted device 14 may also be operable to execute various forms of sensory alarm routines 30. Sensory alarm routines may trigger audible alarms, such as a series of periodic or continuous audible tones or a pre-recorded message, visual alarms, such as messages displayed on the target device display or vibrational alarms, which cause the device to vibrate periodically or continually. Sensory alarm routines serve to acknowledge to the general public that the device is misplaced, lost or stolen. The emergency/covert surveillance routine 27 may be operated when the emergency surveillance state is invoked or the emergency/covert surveillance routine 27 may be operated in a "stealth" mode when the covert surveillance state is invoked.

Additionally, the target device 14 may be operable to execute power reserve routine 32 that is operable maintaining a power reserve for the location, tracking and/or recovery process. For example, power may be reserved for determining location/GPS fixes, capturing image data and communicating with the remote communication device, such as a secondary wireless device, PC or network entity.

Figure 3:
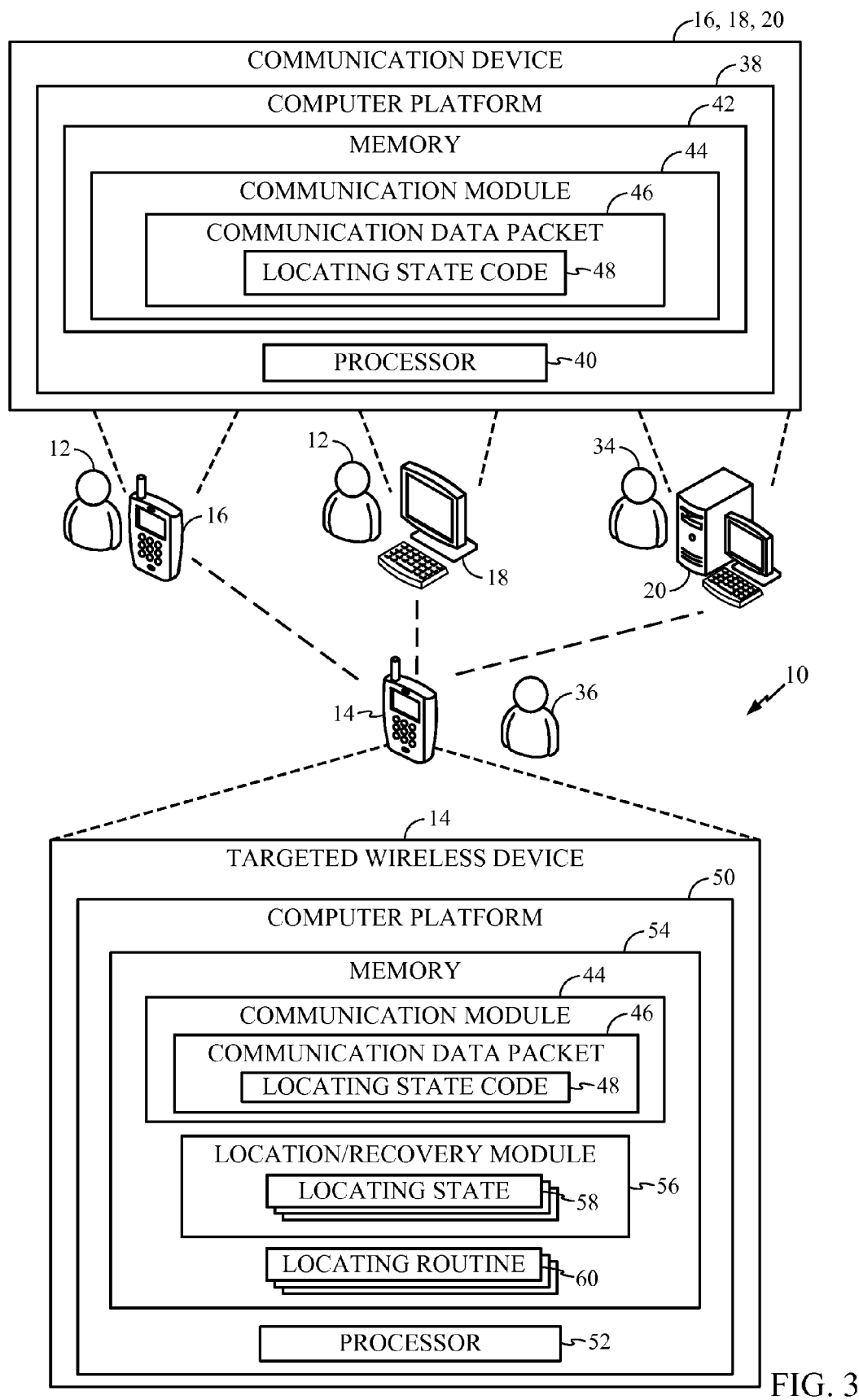
FIG. 3 is a block diagram of a system for locating, tracking and/or recovering a targeted wireless communication device, according to another aspect.

In addition, the target device 14 may be operable to execute any other locating, tracking, recovery and/or surveillance routine 32 that may be operable to assist in accomplishing recovery of the target device 14. For example, the locating routine 32 may include a routine for changing an operational mode, such as changing the targeted device from a "silent", "vibrate" or "low-volume" ring state to an "audible" or "high volume" ring state. Often, the user of the targeted device will misplace the device while the device is in the "silent", "vibration" or "low volume" ring state. These states prohibit the device from being located by merely calling the device and listening for the ring tone. In addition, in certain instances it may be necessary to change the misplaced targeted device from an "off" state to an "on" state prior to changing the ring tone state or performing other locating routines on the targeted wireless device. Other locating, tracking, recovery and surveillance routines 32 may include routines operable for jamming, scrambling or otherwise corrupting the communication data, such as voice data, text data, image data or the like. Referring to FIG. 3, a block diagram is depicted of the system 10 for locating, tracking and attempting recovery of a target wireless communication device 14. As previous discussed, a remote computing device is employed to generate and communicate the requisite communication data packet to the target device 14. The remote device may include, but is not limited to, an alternate or secondary wireless device 16 in the possession of the user/owner 12 of the targeted device, a PC 18 accessible to the user/owner 12 and having access to a web interface operable for generating and communicating the requisite communication data packet and a network entity device 20 operated by network/service provider representative 34. The target device 14, which may be in the possession of finder/thief 36, receives the communication data packet detects the locating state code in the communication that is associated with a locating state and executes one or more locating routines associated with the locating state.

Figure 4:
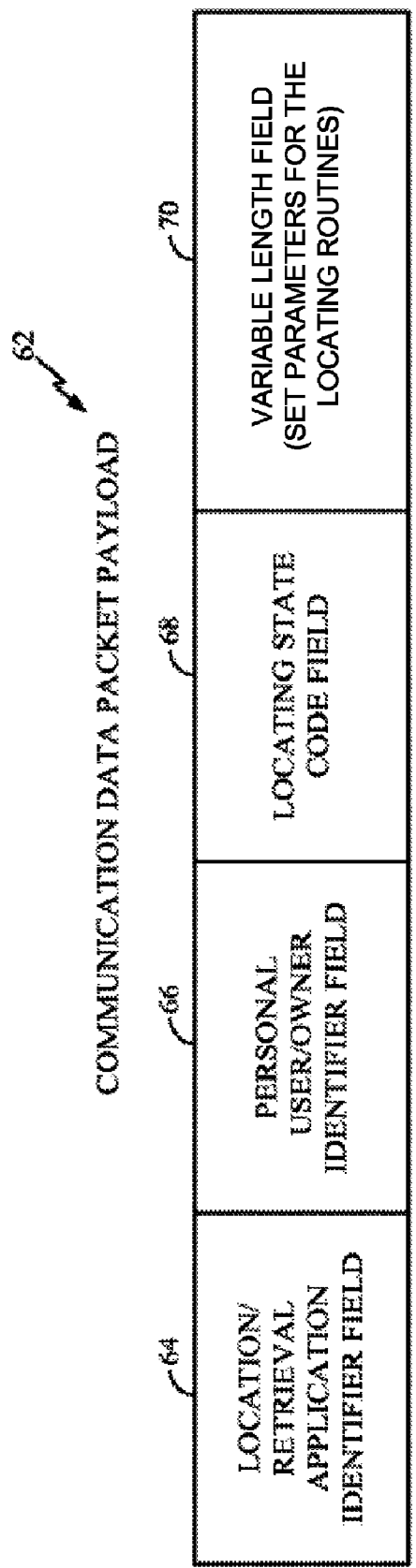
FIG. 4 is an example of a communication data packet payload, according to an aspect.

The remote computing device 16, 18, 20 includes a computer platform 38 having a processor 40 and a memory 42. The memory includes a communications module 44 operable for generating and communicating communication data packet 46, which may correspond to a voice call packet or a data call packet. In one aspect, communication data packet 46 is defined as a Short Message Service (SMS) data packet. FIG. 4, which will be discussed in detail infra., provides for an exemplary payload for an SMS data packet, according to an aspect. The communication data packet 46 will include a locating state code 48 that is associated with one of a plurality of locating states, which are operable on the target device 14. Each locating state may be associated with one or more location routines that are executable on the target devices 14.

The targeted wireless communication device 14 includes a computer platform 50 having a processor 52 and a memory 54. The memory includes communications module 44 operable for receiving communication data packet 46, which, as previously discussed, may correspond to a voice call packet or a data call packet. In one aspect, communication data packet 46 is defined as a Short Message Service (SMS) data packet. The communication module 44 is operable to parse the locating state code 48 from the communication data packet 46 and communicate the locating state code 48 to the location/recovery module 56. The location/recovery module is operable for matching the locating state code 48 to an associated locating state 58 and triggering the execution of the locating routines 60 that are associated with the locating state. Examples of locating states include, but are not limited to, a misplaced state, a lost state, a stolen state, a tracking state, a surveillance state, such as an emergency surveillance state or a covert surveillance state, and the like. Additionally, each state may include sub-states for varying the routines associated with a state or varying the sequence in which routines are executed. As previously noted, each location state is associated with one or more location routines and, in some aspects; the location state may be associated with a predetermined sequence of routines. Examples, of location routines include, but are not limited to, an input mechanism disablement routine, an application disablement routine, a device enablement/disablement routine, a device state change routine, such as a ring state change routine, a geographic location determining routine, a still image capture routine, a moving image capture routine, an audio capture routine, a sensory alarm routine, a user data retrieval routine, a user data deletion routine, a user data lockdown routine, a captured data upload routine and the like.

Referring to FIG. 4, an exemplary payload 62 of a SMS communication data packet is shown. As previously discussed SMS may be used as the communication module 44 for communicating the requisite communication data packet 46 from the remote device 16, 18 or 20 to the target device 14. The payload may include a location/retrieval application identifier field 64 operable for identifying the payload, upon receipt by the target device, as being associated with the locating/retrieval application. The payload 62 may additionally include personal user/owner identifier field 66 operable for identifying the user 12, network/service provider representative 34 or the like as an authorized entity for implementing the location/recovery application on the target device 14. In this regard, authentication insures that the target device is not placed in a locating state by an unauthorized individual or entity. The payload 62 may additionally include a locating state code field 68 operable for identifying the locating state that is to be operational on the target device 14.

The payload 62 of SMS communication data packet 46 may include a variable length field 70 operable for setting parameters for the one or more routines that are associated with the locating state. For example, parameter settings may include the frequency required for location determinations, the frequency at which images or audio are captured, the memory location of data that is required to be deleted, an audible message to be produced, a visual message to be displayed or the like. In this regard, the variable length field 70 provides for the parameters related to the location routine to be dynamically defined by the user/owner and/or network service provider based on the current requirements dictated by the user/owner and/or network service provider.

Figure 5:
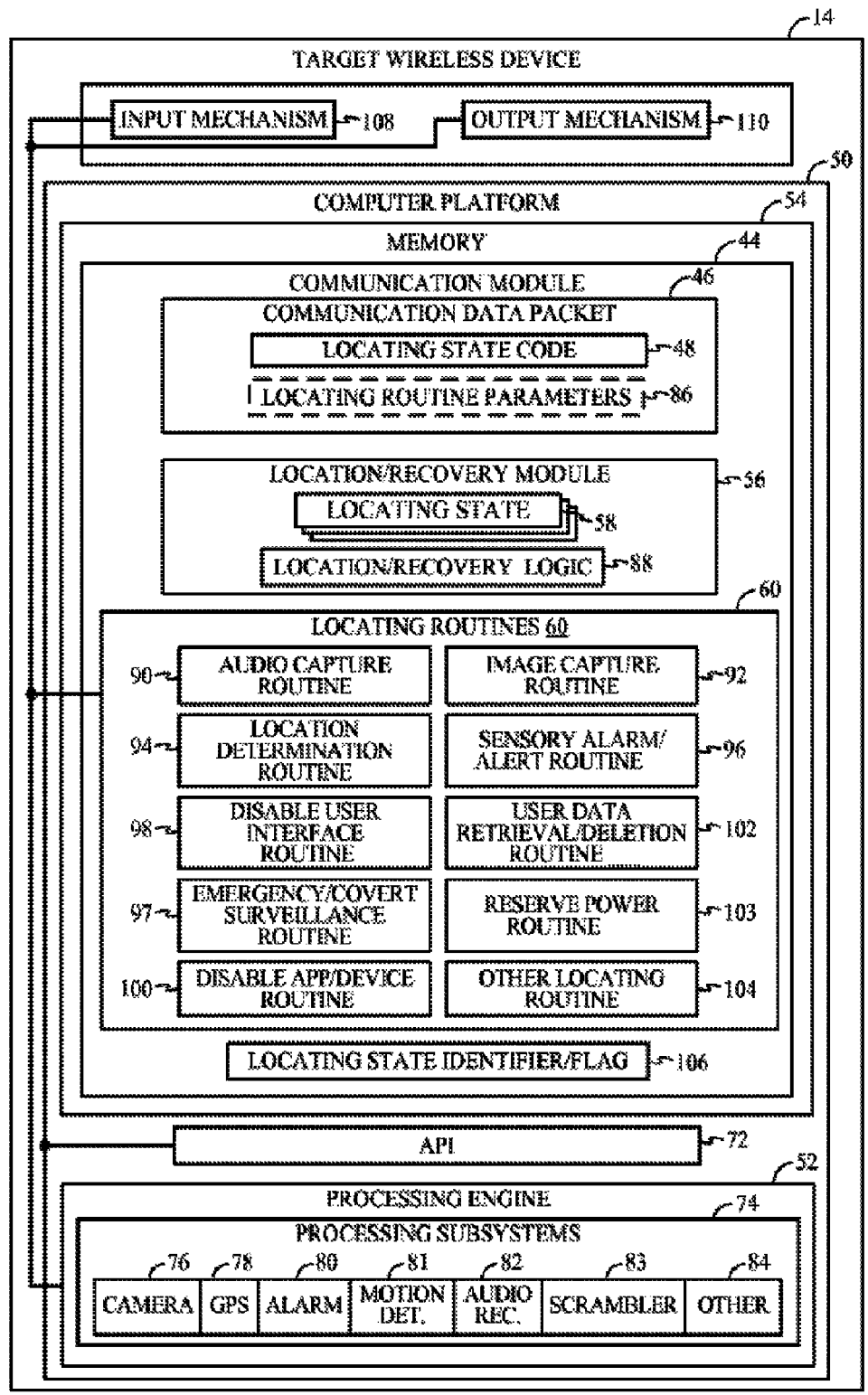
FIG. 5 is a block diagram of a target wireless communication device, according to another aspect.

Referring to FIG. 5, according to one aspect, a detailed block diagram representation of targeted wireless communication device 14 is depicted. The wireless communication device 14 may include any type of computerized, communication device, such as cellular telephone, Personal Digital Assistant (PDA), two-way text pager, portable computer, and even a separate computer platform that has a wireless communications portal, and which also may have a wired connection to a network or the Internet. The wireless communication device can be a remote-slave, or other device that does not have an end-user thereof but simply communicates data across the wireless network, such as remote sensors, diagnostic tools, data relays, and the like. The present apparatus and methods for sharing, locating, and attempting recovery of a wireless communication device can accordingly be performed on any form of wireless communication device or wireless computer module, including a wireless communication portal, including without limitation, wireless modems, PCMCIA cards, access terminals, desktop computers or any combination or sub-combination thereof.

The wireless communication device 14 includes computer platform 50 that can transmit data across a wireless network, and that can receive and execute routines and applications. Computer platform 50 includes memory 54, which may comprise volatile and nonvolatile memory such as read-only and/or random-access memory (RAM and ROM), EPROM, EEPROM, flash cards, or any memory common to computer platforms. Further, memory 54 may include one or more flash memory cells, or may be any secondary or tertiary storage device, such as magnetic media, optical media, tape, or soft or hard disk.

Further, computer platform 50 also includes processor 52, which may be an application-specific integrated circuit ("ASIC"), or other chipset, processor, logic circuit, or other data processing device. Processor 52 or other processor such as ASIC may execute an application programming interface ("API") layer 72 that interfaces with any resident programs, such as communication module 44 and location/recovery module 56, stored in the memory 54 of target wireless device 54. API 72 is typically a runtime environment executing on the respective wireless device. One such runtime environment is Binary Runtime Environment for Wireless® (BREW®) software developed by Qualcomm, Inc., of San Diego, Calif. Other runtime environments may be utilized that, for example, operate to control the execution of applications on wireless computing devices. In some aspects, API 72 may serve to launch the location routines 60 upon receipt of the communication data packet 46, detection of the accompanying locating state code 48 and determination of the associated locating state 58. Alternatively, one or more of the location routines may be in an "always-on" state, running in the background on the target device 14, otherwise referred to as a "silent mode" and are awaiting receipt of the communication data packet 46, detection of the accompanying locating state code 48 and determination of the associated locating state 58 prior to moving to an active state that captures data, activates an alarm or performs another location related action.

Processor 52 includes various processing subsystems 74 embodied in hardware, firmware, software, and combinations thereof, that enable the functionality of communication device 14 and the operability of the communication device on a wireless network. For example, processing subsystems 74 allow for initiating and maintaining communications, and exchanging data, with other networked devices. In aspects in which the communication device is defined as a cellular telephone the communications processor 52 may additionally include one or a combination of processing subsystems 74, such as: sound, non-volatile memory, file system, transmit, receive, searcher, layer 1, layer 2, layer 3, main control, remote procedure, handset, power management, digital signal processor, messaging, call manager, Bluetooth® system, Bluetooth® LPOS, position engine, user interface, sleep, data services, security, authentication, USIM/SIM, voice services, graphics, USB, multimedia such as MPEG, GPRS, etc (all of which are not individually depicted in FIG. 2 for the sake of clarity).

For the disclosed aspects, processing subsystems 74 of processor 52 may include any subsystem components that interact with the communication module 46 and location/recovery module 56. For example, processing subsystems 74 may include locating and tracking devices/applications that are implemented in conjunction with locating routines 60. Exemplary processing subsystems 74 may include imager/camera 76, Global Positioning System (GPS) sensor 78, alarm 80, motion detector 81, audio recorder 82, scrambler 83 and any other apparatus 84 that is implemented in relation to a locating routine 60. Alternatively, one or more of the processing subsystems 74 shown in FIG. 4 may exist as modules/applications and/or logic stored in memory 54.

The memory 54 of computer platform 50 includes communications module 44 operable for receiving communication data packet 46, which, as previously discussed, may correspond to a voice call packet or a data call packet. In one aspect, communication data packet 46 is defined as a Short Message Service (SMS) data packet. The communication module 46 is operable to identify the communication data packet, based on payload identification, as being a location/recovery communication data packet. Additionally, the communication module 46 is operable to authenticate the sender of the communication data packet based on an authentication identifier in the payload. The communication module 44 is operable to parse the locating state code 48 from the communication data packet 46 and communicate the locating state code 48 to the location/recovery module 56. Additionally, communication module 44 may be operable to parse the variable length field that includes locating routine parameters 86 and communicate the locating routine parameters to the location/recovery module 56.

The memory of computer platform 50 also includes location/recovery module 56 that includes location/recovery logic 88 operable to match the locating state code 48 to one of a plurality of locating states. The location/recovery module is operable for matching the locating state code 48 to an associated locating state 58 and triggering the execution of the locating routines 60 that are associated with the locating state.

Examples of locating states include, but are not limited to, a misplaced state, a lost state, a stolen state, a tracking state, a surveillance state, such as an emergency surveillance state or covert surveillance state, and the like. Additionally, each state may include sub-states, for example, a major lost state and a minor lost state, for varying the routines associated with a state or varying the sequence in which routines are executed. The location/recovery logic 88 may also be operable for applying the locating routine parameters 86 to the applicable location routine 60.

Additionally, location/recovery logic 88 may be operable to place a locating state identifier/flag 106 in a non-volatile portion of memory 54 to identify the current location state 58 that the target device is experiencing. By placing locating state identifier/flag 106 in non-volatile memory, the device is insured of returning to the current location state 58 if the device temporarily loses power (for example, if the battery is removed), followed by the subsequent restoration of power. The locating state identifier/flag 106 may define an associated expiration parameter that dictates removal of the identifier/flag from the memory after a stated period of time or an additional communication data packet 46 may be received that provides for the termination of a locating state 58 and the deletion of the identifier/flag 106 from memory 54.

The memory of 24 of computer platform 20 also includes one or more location routines 60 that are associated with one or more of the plurality of locating states 58. As shown, location routines 60 may include, but are not limited to, audio capture routine 90, image capture routine 92, location determination routine 94, sensory alarm/alert routine 96, emergency/covert surveillance routine 97, user interface disablement routine 98, application/device disablement routine 100, user data lockdown/retrieval/deletion routine 102, reserve power routine 103, and any other locating-related routine 104. The audio capture routine 90 and the image capture routine 92 are operable to record audio and still and/or moving images periodically or based on the occurrence of an event, for example a call event. The audio and image data may subsequently be used to determine the identity of the finder/thief of the wireless device or identify the location of the device based on the surrounding environment. The location determination routine 94 is operable to determine a geographic location of the target device 14 using GPS sensors or any other conventional means of determining geographic location. Captured image and/or audio data and geographic location data may be periodically updated to the user/owner 12 of the target device 14 via the secondary wireless device 16 and/or a web interface, a network entity 18, such as a server associated with a web interface and/or a network/service provider representative 20 for subsequent analysis for attempting to determine the location of the lost/stolen device and/or the identity of the finder/thief. Additionally, the audio capture routine 90, the image capture routine 92 and the location determination routine 94 may be executed in a "stealth" mode, so that conventional indicators that would normally be presented, such as displayed lights or messages or audible tones, are suppressed to insure that the finder/thief is unaware that these routines are currently being executed. The "stealth" mode may be the mode of choice for a covert surveillance state.

The sensory alarm/alert routine 96 may be operable to provide audible, visual or vibrational alarms on the device. For example, an audible alarm may be provided periodically, continually and/or at an increasing volume to identify the device as a misplaced, lost or stolen device. The audible alarm may also be configured to present an audible voice message that may be defined within the routine or the voice message may be provided to the routine dynamically via the variable length field in the communication data packet. In another aspect, the alarm/alert routine 96 may be configured to provide a visual alarm or message that may be displayed on the device. The message that is displayed may be defined within the routine or the message may be provided to the routine dynamically via the variable length field in the communication data packet. For example, in one aspect, if the device is lost—user contact information may be displayed for contacting the user/owner of the device or a self-addressed or network service provider-addressed shipping label with prepostage may be displayed to allow the finder of the device to conveniently place the device in a postal box for delivery to the user/owner 12 or service provider. In other aspects, the alarm/alert routine 96 may be configured to vibrate the device, either periodically or continually, to alert the finder/thief that the device is misplaced, lost or stolen.

The emergency/covert surveillance routine 97 is operable to provide surveillance of a location if an emergency event requiring surveillance occurs, for example, if a major accident occurs, such as an automobile accident, or a kidnapping/abduction occurs. In these instances, a targeted wireless communication device 14 in the possession of an accident/kidnapping victim or someone close to the accident/kidnapping may be remotely accessed via a secondary wireless device 16, PC 18 and/or network device 20 in the control of a law enforcement entity, an emergency service provider or any other person/entity concerned with the safety and welfare of the victims. Additionally, other remote devices may signal the targeted wireless device 14 for initiating the surveillance routine 97. For example, air bags in an automobile may be configured to send, upon deployment, a wireless signal to the targeted wireless communication device 14 to activate the surveillance routine 97. In addition, the targeted wireless communication device 14 may be configured to self-activate the emergency/covert surveillance routine 97, if a event occurs, such as placement of an emergency call (e.g. a "911" call) or detection of impact of an automobile accident (based on a motion detector 81 processing subsystem in the targeted wireless device 14).

The emergency/covert surveillance routine 97 may be operable to activate the still or moving image capture routine 24 to capture still or moving image data, the geographic location-determining routine 22 for determining location, the audio capture routine 26 for capturing audio and the like. In certain aspects, the remote surveillance requesting party, such as a law enforcement agency, emergency service provider or the like may have the ability to remotely control the surveillance mechanisms once they are activated. For example, the surveillance requesting party may be able to provide inputs to a user interface to remotely access and control the image capturing devices, such as controlling movement and direction of the image capturing device and the like. Once the information is captured, it may be wirelessly communicated to the requesting entity or any other law enforcement entity, emergency service provider or the like. In a kidnapping event or any other event involving a criminal party, the surveillance routine 97 may be operated in a "stealth" mode, so that conventional indicators that would normally be presented, such as displayed lights or messages or audible tones, are suppressed to insure that the kidnapper/criminal is unaware that these routines are currently being executed. For example, if the location state is defined as a covert surveillance state, the surveillance routine 97 may be operated in the "stealth" mode to elude the perception of surveillance from wrongdoers.

The user interface disablement routine 98 and the application/device disablement routine 100 are operable to disable a user input mechanism 108 or output mechanism 110, such as the keypad or touch screen of the target device, any application that is executable on the device, such as a communication call application, a contact/phone book application and/or the like, or disable the device in its entirety. The user interfaces, applications and/or the device may be disabled permanently or disabled periodically to allow for the device to periodically capture data, such as image and/or audio data, determine location and upload the data accordingly.

The user data lockdown/retrieval/deletion routine 102 may be operable to lockdown the user data to prohibit a finder/thief from accessing any or all of the user data. The user data retrieval/deletion routine 102 may also be operable to retrieve the user data from the device, communicate the retrieved data to a network database and subsequently delete the user data from the targeted device.

The reserve power routine 103 may be operable to maintaining a power reserve for the location, tracking and/or recovery process. For example, power may be reserved for determining location/GPS fixes, capturing image data and communicating with the remote communication device, such as a secondary wireless device, PC or network entity. The power reserve routine 103 may implement a timer to "awaken"/power-up the device at predetermined intervals for determining a location, capturing image data, setting off a sensory alarm and/or communicating with the remote communication device. In addition, the power reserve routine 103 may implement a timer to provide for the device to execute a sleep mode, standby mode or auto-shutoff after a predetermined time period. In alternate aspects, the reserve power routine 103 may implement and/or the targeted wireless device 14 may include a back-up power supply, such as a secondary battery or solar-cell that is implemented if the primary battery is removed or damaged, such as removal/damage by a thief, criminal or the like. In addition to primary power source failure or exhaustion, the reserve power routine 103 and/or back-up power supply may be executed or implemented in response to predetermined events, including but not limited to periodic time intervals, an SMS message, an emergency signal, a voice command, or the like.

Other locating-related routines 104 may include, but are not limited to, a routine for changing an operational mode, such as changing the targeted device from an "off" state to an "on" state or a limited "on" state". Additionally, changing an operational mode may include changing from a "silent", "vibrate" or "low-volume" ring state to an "audible" or "high volume" ring state to facilitate locating a misplaced, lost or stolen targeted device.

Additionally, locating-related routines 104 may include a communication corruption routine operable for corrupting any and/or all communication transmitted from and received by the targeted wireless device 14. For example, a communication corruption routine may "jam" communications, such as voice, data and the like by introducing noise or otherwise scrambling any and/or all transmitted and received communication signals. In such aspects, the wireless device may include a scrambler 83 in the processing subsystems 74 that may be remotely accessed. The scrambler is operable to inject random noise into all communications, including voice, text, images and video data. The scrambler may also use a secondary radio transmitter, for example, to emit a jamming signal with additional white-Gaussian-noise.

As previously noted, the locating state 58 is associated with one or more locating routines 60 and, in some aspects, the locating state 58 is associated with a sequence of locating routines. For example, a stolen state may define a sequence of locating routines that initially perform location determination routine 94, audio capture routine 90, and/or image capture routine 92, followed by sensory alarm routine 96, user data lockdown/retrieval/deletion routine 102 and/or disablement routines 98 and/or 100. In another example, a misplaced state may define a sequence of sensory alarm routine 96 followed by lockdown/retrieval deletion routine 102 and/or disablement routines 98 and 100, if the device is not located within a prescribed time period.

Additionally, as previously noted, target wireless communication device 14 has input mechanism 108 for generating inputs into communication device, and output mechanism 110 for generating information for consumption by the user of the communication device. For example, input mechanism 108 may include a mechanism such as a key or keyboard, a mouse, a touch-screen display, a microphone, etc. In certain aspects, the input mechanisms 108 provide for user input to interface with an application, such as communication module 46 and/or location/recovery module 56. Further, for example, output mechanism 110 may include a display, an audio speaker, a haptic feedback mechanism, etc. In the illustrated aspects, the output mechanism 110 may include a display operable to display messages or visual alerts/alarms to the finder/thief of the target device 14.

Figure 6:
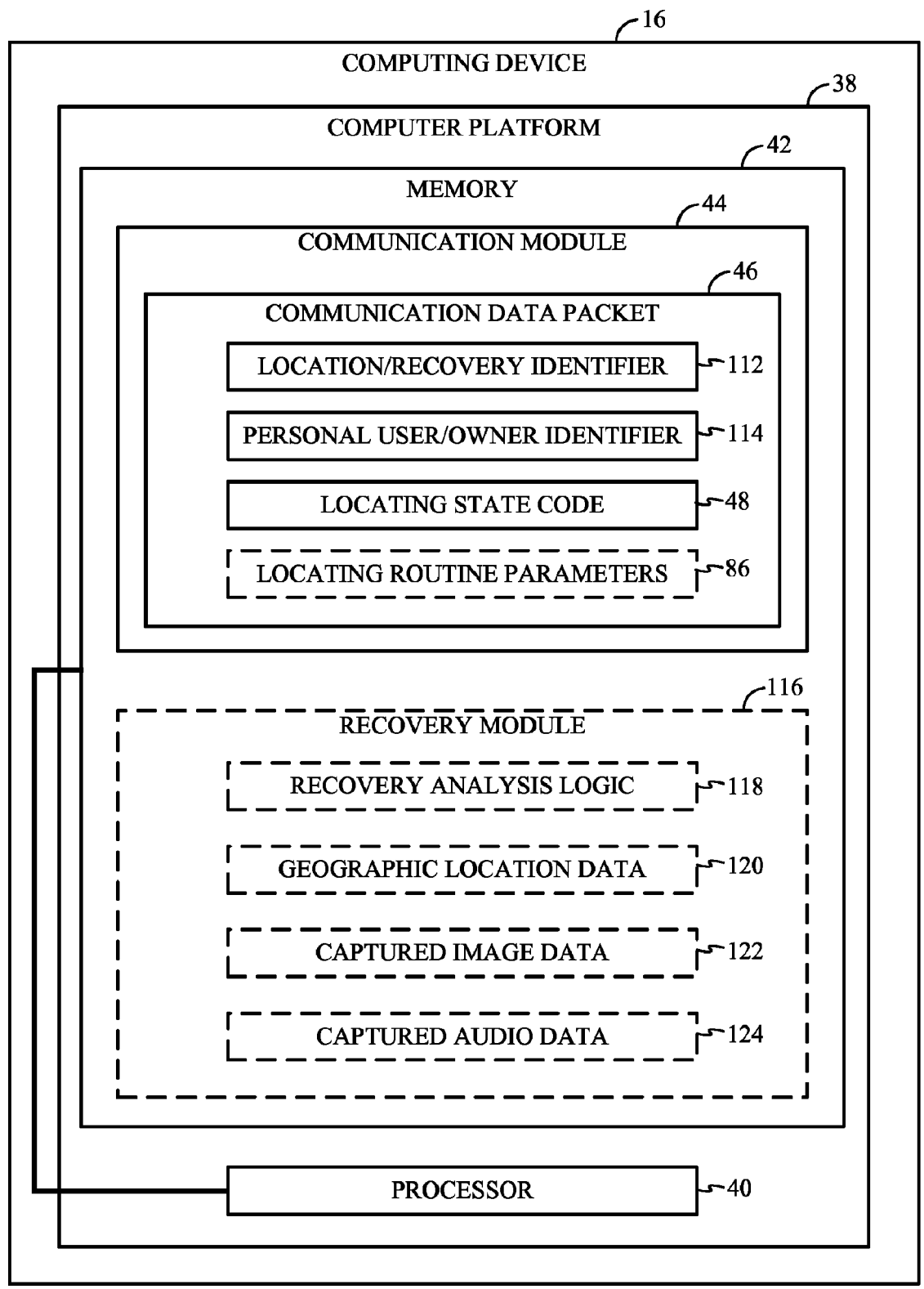
FIG. 6 is a block diagram of a computing device that attempts to locate, track and/or recover a target wireless communication device, according to an aspect.

Referring to FIG. 6, according to another aspect, a detailed block diagram of a computing device 16, 18, 20 operable to generate and communicate a communication data packet that includes a location state code. The computing device 16, 18, 20 may include any type of computerized, communication device, such as personal computer (PC), cellular telephone, Personal Digital Assistant (PDA), two-way text pager, portable computer, and even a separate computer platform that has a wireless communications portal, and/or may have a wired connection to a network or the Internet. The wired or wireless computing device can be a remote-slave, or other device that does not have an end-user thereof but simply communicates data across a wired or wireless network, such as remote sensors, diagnostic tools, data relays, and the like. The present computing apparatus and associated methods can accordingly be performed on any form of wired or wireless computing device or wireless computer module, including a wireless communication portal, including without limitation, wireless modems, PCMCIA cards, access terminals, desktop computers or any combination or sub-combination thereof.

The computing device 16, 18, 20 includes computer platform 38 that can transmit data across a wireless and/or wired network, and that can receive and execute routines and applications. Computer platform 38 includes memory 42, which may comprise volatile and nonvolatile memory such as read-only and/or random-access memory (RAM and ROM), EPROM, EEPROM, flash cards, or any memory common to computer platforms. Further, memory 42 may include one or more flash memory cells, or may be any secondary or tertiary storage device, such as magnetic media, optical media, tape, or soft or hard disk. Further, computer platform 38 also includes processor 40, which may be an application-specific integrated circuit ("ASIC"), or other chipset, processor, logic circuit, or other data processing device.

Memory 42 of computer platform 38 additionally includes communications module 44 operable for generating and communicating communication data packet 46, which may correspond to a voice call packet or a data call packet. In one aspect, communication data packet 46 is defined as a Short Message Service (SMS) data packet. The communication data packet 46 may include a location/recovery identifier 112 operable for identifying the communication data packet as a location/recovery related communication data packet that provides for executing the related location/recovery module 56 upon receipt by the target device 14. The communication data packet 46 may additionally include a personal user/owner identifier 114 operable for authenticating the user/owner of the target device and/or the network service provider as an individual or entity authorized to perform location, tracking and/or recovery on the target device 14. Additionally, the communication data packet 46 includes a locating state code 48 that is associated with one of a plurality of locating states, which are operable on the target device 14. Each locating state may be associated with one or more location routines that are executable on the target devices 14. The communication data packet 48 may additionally include locating routine parameters 86 defined in variable length field that allows for text inputs. By defining locating routine parameters in the communication data packet, the user/owner of the target device or the authorized sending entity is able to dynamically control the location, tracking and attempted recovery of the target device.

The memory 42 of computer platform 38 may include recovery module 116 that includes recovery analysis logic 118 operable for analyzing the data captured by the target device. The recovery analysis logic 118 may analyze captured and uploaded geographic location data 120, image data 122 and/or audio data 124 to determine the location of the target device 14 and/or the identity of the finder/thief. While the recovery module 116 is depicted as being embodied in the same device that generates and sends the communication data packet to the target device to initiate the location/recovery process, in many aspects, the recovery module 116 may be embodied in a separate network device, such as a service provider controlled network device, a tracking service controlled network device, a law enforcement controlled network device or the like.

Figure 7:
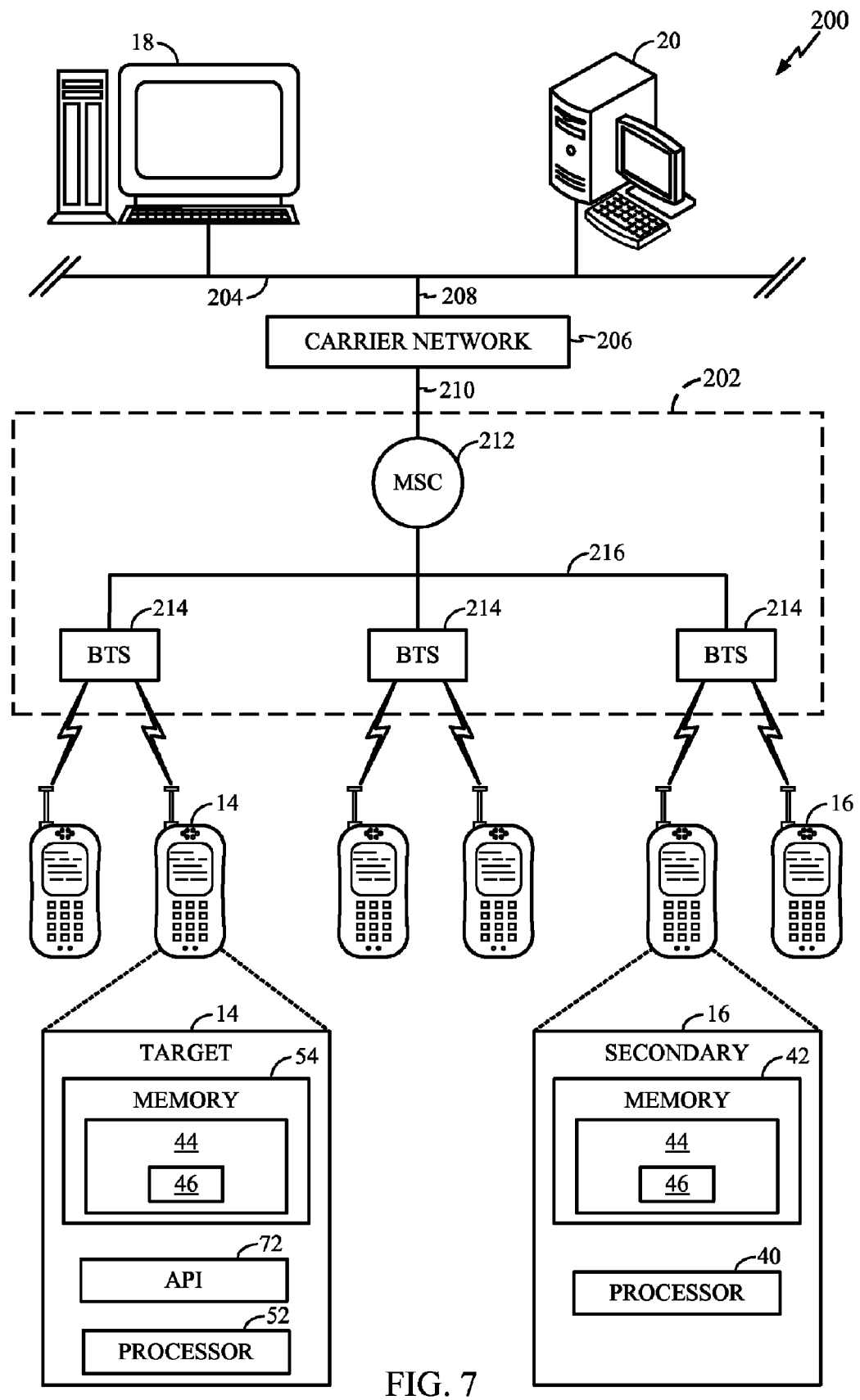
FIG. 7 is a block diagram of an exemplary cellular telephone network used in communicating with the targeted wireless communication device, according to an aspect.

FIG. 7 represents a block diagram of a cellular network 200. A wireless network 202 may comprise a cellular network 200 and, as such may be implemented to communicate communication data packets 46 to the target wireless device 14, and upload captured data from target wireless device 14 to computer devices 16, 18 and/or 20. Referring to FIG. 7, in one aspect, target wireless device 14 and alternate/secondary wireless device 16 comprise a wireless communication device, such as a cellular telephone. In present aspects, wireless communication devices are configured to communicate via the cellular network 200. The cellular network 200 provides wireless communication devices 14 and 16 the capability to communicate communication data packets and upload captured data related to locating and recovering a target device. The cellular telephone network 200 may include wireless network 202 connected to a wired network 204 via a carrier network 206. FIG. 7 is a representative diagram that more fully illustrates the components of a wireless communication network and the interrelation of the elements of one aspect of the present system. Cellular telephone network 200 is merely exemplary and can include any system whereby remote modules, such as wireless communication devices 14 and 16 communicate over-the-air between and among each other and/or between and among components of a wireless network 202, including, without limitation, wireless network carriers and/or servers.

In network 200, personal computer 18 can be in communication over a wired network 204 (e.g. a local area network, LAN). Further, a network server 20, such as service provider server 20 may be in communication with network device 18 via the wired network 204. PC 18 and network server 20 may generate and communicate communication data packets 46 and upload location related captured data from the target device 14. PC 18 and network server 20 may be present on the cellular telephone network 200 with any other network components that are needed to provide cellular telecommunication services. PC 18 and/or network server 20 communicate with carrier network 206 through data links 208 and 210, which may be data links such as the Internet, a secure LAN, WAN, or other network. Carrier network 206 controls messages (generally being data packets) sent to a mobile switching center ("MSC") 212. Further, carrier network 206 communicates with MSC 212 by a network 210, such as the Internet, and/or POTS ("plain old telephone service"). Typically, in network 210, a network or Internet portion transfers data, and the POTS portion transfers voice information. MSC 212 may be connected to multiple base stations ("BTS") 214 by another network 216, such as a data network and/or Internet portion for data transfer and a POTS portion for voice information. BTS 214 ultimately broadcasts messages wirelessly to the wireless communication devices 14 and 16, by short messaging service ("SMS"), or other over-the-air methods.

Figure 8:
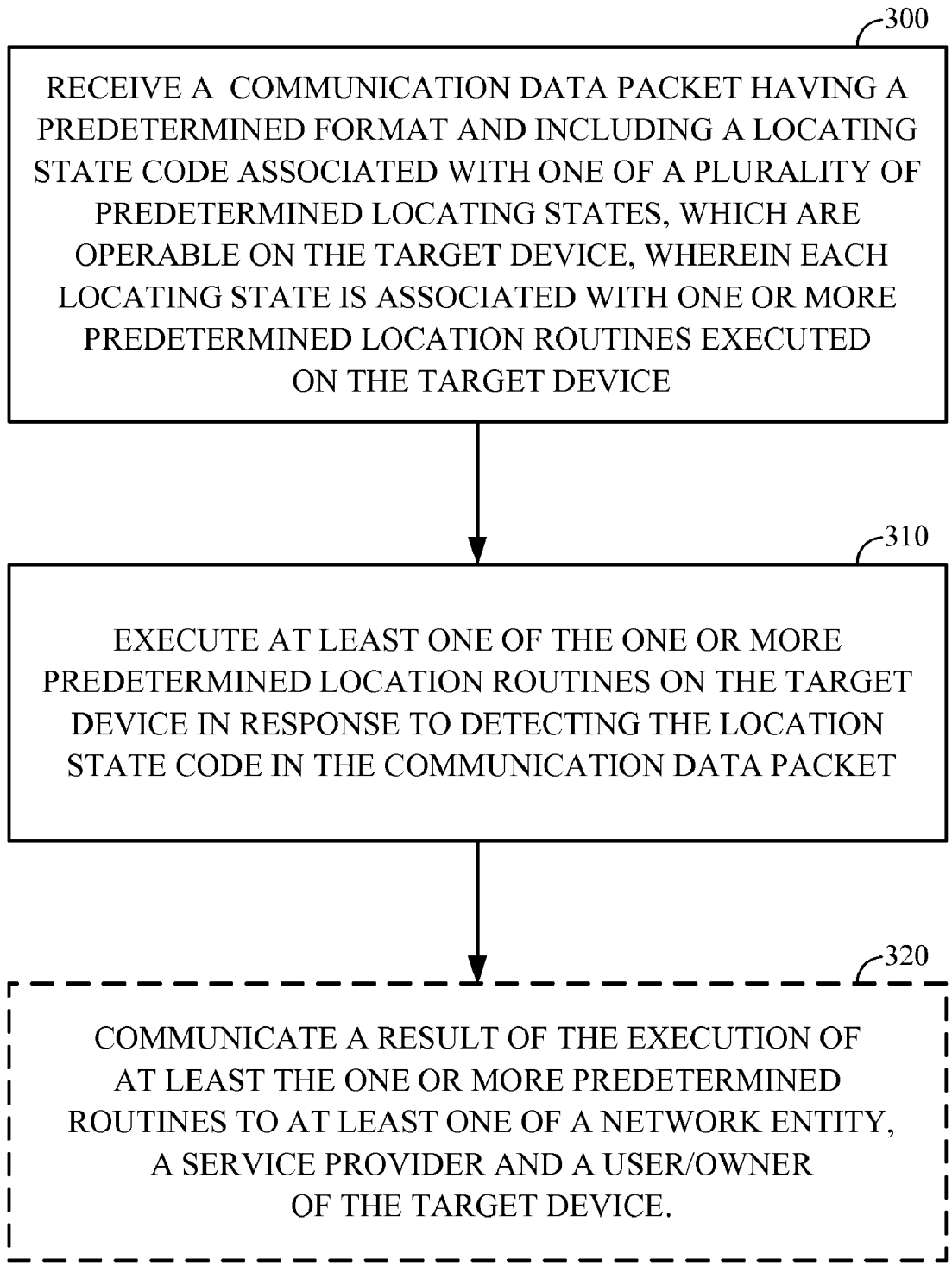
FIG. 8 is a flow diagram of a method for locating a targeted wireless communication device; according to one aspect.

Referring, to FIG. 8, a flow diagram of a method for locating a wireless communication device is depicted. At Event 300, a targeted wireless communication device receives a communication data packet. The communication data packet has a predetermined format, such as SMS or like, and includes a locating state code. The locating state code is associated with one of a plurality of predetermined locating states, which are operable on the targeted wireless device is operable. Each locating state is stored in a memory on the targeted wireless device and includes one or more predetermined location routines carried out by the targeted wireless device. The locating state may include, but is not limited to, a misplaced state, a lost state, a stolen state, a tracking state, a surveillance state, such as an emergency surveillance state or covert surveillance state, and the like. Receiving the communication data packet may trigger the target wireless device to perform a predetermined sequence of routines corresponding to the one of a plurality of locating states associated with the locating state code. Additionally, the communication data packet may include a variable length field for dynamically setting parameters associated with the one or more predetermined routines. In most aspects, the communication data packet is received wirelessly from a remote device, however, in some aspects, the communication data packet may be internally generated and received.

At Event 310, the target wireless device executes at least one of the one or more predetermined location routines on the targeted wireless communication device in response to detecting the location state code in the communication data packet. The location routines may include, but are not limited to, disabling a keypad, disabling a communication call, disabling/enabling the wireless device, disabling a specific application, changing an operational state of the wireless device, such as changing the ring state of the device, determining a geographic position, capturing a still image, capturing a moving image, capturing audio, enabling a sensory alarm, deleting a first set of predetermined user data, retrieving a second set of predetermined user data, and locking access to a third set of user data. Executing the routines may further include operating the wireless device in a stealth mode that disables output by the wireless device of user-perceptible indicators generated during execution of the one or more predetermined location routines in a non-stealth mode. The "stealth" mode is commonly implemented during a covert surveillance state.

At optional Event 320, the target wireless communication device may communicate data that results from the execution of at least the one or more predetermined routines to at least one of a network entity, a service provider and a user of the targeted wireless communication device. In this regard, geographic location data, image data and audio data may be uploaded or otherwise communicated to a network entity, a service provider and a user of the targeted wireless communication device.

Figure 9:
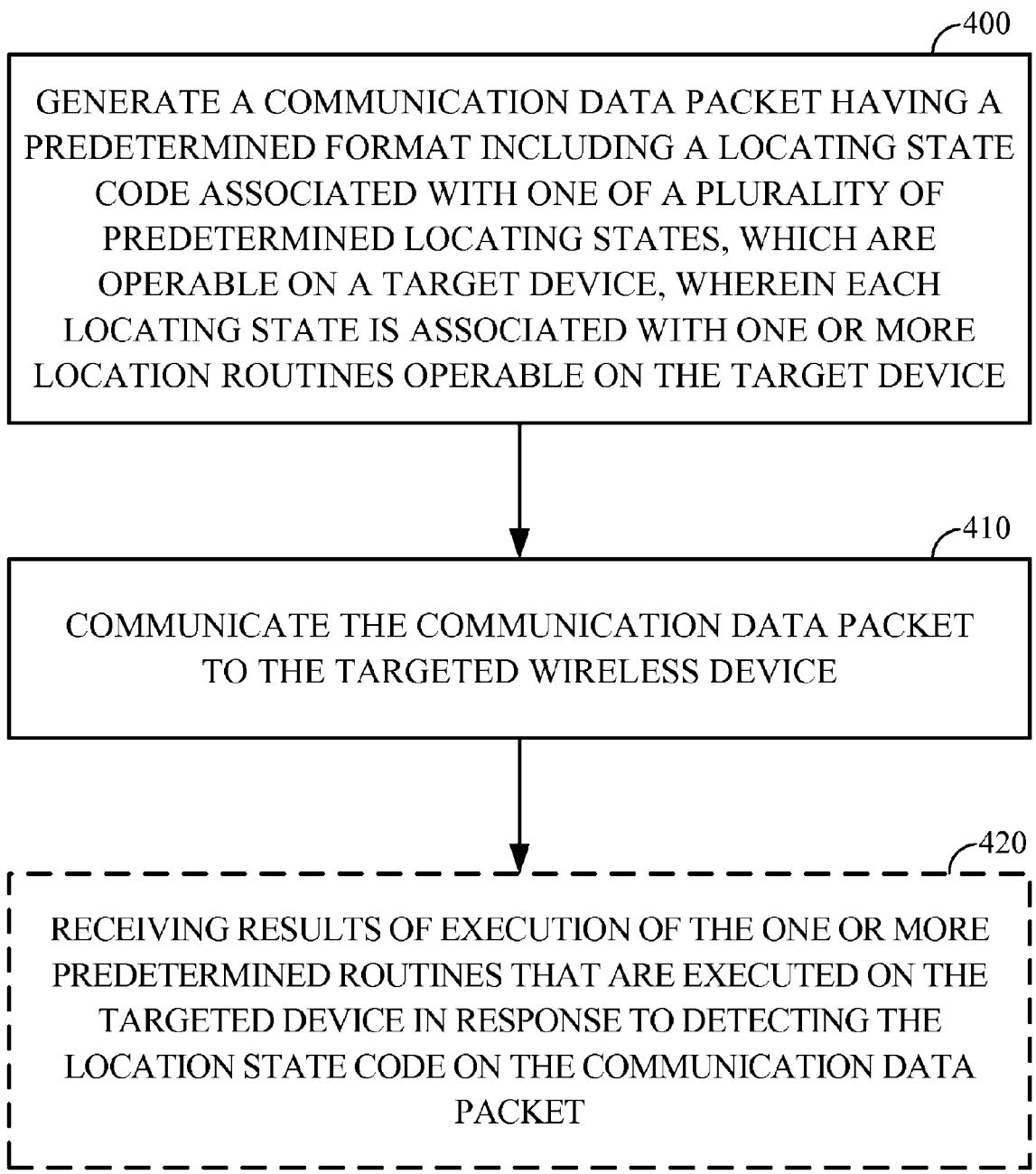
FIG. 9 is a flow diagram of another method for locating a targeted wireless communication device, according to another aspect.

FIG. 9 provides a flow diagram detailing another method for locating a target wireless communication device, according to another aspect. At Event 400, generate a communication data packet having a predetermined format and including a locating state code. The location state code is associated with one of a plurality of predetermined locating states, which are operable on a targeted wireless communication device. Each locating state is associated with one or more predetermined routines operable on the targeted wireless communication device.

At Event 410, the communication data packets are communicated to the targeted wireless communication device and, at optional Event 420, receiving data resulting from the execution of the one or more predetermined routines on the targeted wireless communication device in response to detecting the location state code in the communication data packet.

The various illustrative logics, logical blocks, modules, and circuits described in connection with the embodiments disclosed herein may be implemented or performed with a general purpose processor, a digital signal processor (DSP), an application specific integrated circuit (ASIC), a field programmable gate array (FPGA) or other programmable logic device, discrete gate or transistor logic, discrete hardware components, or any combination thereof designed to perform the functions described herein. A general-purpose processor may be a microprocessor, but, in the alternative, the processor may be any conventional processor, controller, microcontroller, or state machine. A processor may also be implemented as a combination of computing devices, e.g., a combination of a DSP and a microprocessor, a plurality of microprocessors, one or more microprocessors in conjunction with a DSP core, or any other such configuration. Additionally, at least one processor may comprise one or more modules operable to perform one or more of the steps and/or actions described above.

Further, the steps and/or actions of a method or algorithm described in connection with the aspects disclosed herein may be embodied directly in hardware, in a software module executed by a processor, or in a combination of the two. A software module may reside in RAM memory, flash memory, ROM memory, EPROM memory, EEPROM memory, registers, a hard disk, a removable disk, a CD-ROM, or any other form of storage medium known in the art. An exemplary storage medium may be coupled to the processor, such that the processor can read information from, and write information to, the storage medium. In the alternative, the storage medium may be integral to the processor. Further, in some aspects, the processor and the storage medium may reside in an ASIC. Additionally, the ASIC may reside in a user terminal. In the alternative, the processor and the storage medium may reside as discrete components in a user terminal. Additionally, in some aspects, the steps and/or actions of a method or algorithm may reside as one or any combination or set of codes and/or instructions on a machine readable medium and/or computer readable medium, which may be incorporated into a computer program product.

While the foregoing disclosure shows illustrative aspects and/or embodiments, it should be noted that various changes and modifications could be made herein without departing from the scope of the described aspects and/or embodiments as defined by the appended claims. Furthermore, although elements of the described embodiments may be described or claimed in the singular, the plural is contemplated unless limitation to the singular is explicitly stated. Additionally, all or a portion of any aspect and/or embodiment may be utilized with all or a portion of any other aspect and/or embodiment, unless stated otherwise.

Thus, present aspects provide for methods, devices, systems and computer program products for locating, tracking and/or recovering wireless communication devices that have been misplaced, lost or stolen. In addition, the aspects provide for tracking or surveillance of the location or user in instances in which the wireless device has been loaned or is being used for covert surveillance. The aspects rely on communicating a locating state code to the targeted device, which detects the code and executes one or more routines that are associated with the codes. In this regard, the targeted device is capable of carrying out different routines or sequences of routines depending on the state of the device, such as misplaced state, lost state, stolen state or the like.

Many modifications and other aspects will come to mind to one skilled in the art to which this invention pertains having the benefit of the teachings presented in the foregoing descriptions and the associated drawings. Therefore, it is to be understood that the aspect is not to be limited to the specific aspects disclosed and that modifications and other aspects are intended to be included within the scope of the appended claims. Although specific terms are employed herein, they are used in a generic and descriptive sense only and not for purposes of limitation. Accordingly, the described aspects are intended to embrace all such alterations, modifications and variations that fall within the spirit and scope of the appended claims. Furthermore, to the extent that the term "includes" is used in either the detailed description or the claims, such term is intended to be inclusive in a manner similar to the term "comprising" as "comprising" is interpreted when employed as a transitional word in a claim.

What is claimed is:

1. A method for locating a targeted wireless communication device, the method comprising:
    receiving, at the targeted wireless communication device, a communication data packet having a format comprising a locating state code associated with one of a plurality of locating states in which the targeted wireless device is operable, wherein each locating state is stored in a memory on the targeted wireless communication device and comprises one or more location routines carried out by the targeted wireless device; and
    executing at least one of the one or more location routines on the targeted wireless communication device in response to detecting the locating state code in the communication data packet, wherein executing further comprises operating the wireless device in a stealth mode that disables output by the wireless device of user-perceptible indicators generated during execution of the one or more location routines in a non-stealth mode.

2. The method of claim 1, further comprising communicating a result of the execution of at least the one or more routines to at least one of a network entity, a service provider and a user of the targeted wireless communication device.

3. The method of claim 1, wherein receiving the communication data packet further comprises triggering the wireless device to perform a sequence of routines associated with the one or more location routines and corresponding to the one of a plurality of locating states associated with the locating state code.

4. The method of claim 1, wherein receiving the communication data packet further comprises receiving a communication data packet corresponding to one of a data call or a voice call.

5. The method of claim 1, wherein receiving the communication data packet further comprises receiving a Short Message Service (SMS) communication data packet.

6. The method of claim 5, wherein the SMS communication data packet further comprises receiving a variable length field for setting parameters associated with the one or more routines.

7. The method of claim 1, wherein executing further comprises enabling one of a misplaced state, a lost state, a stolen state, a tracking state, an emergency surveillance state and a covert surveillance state.

8. The method of claim 1, wherein executing further comprises at least one of disabling a keypad, disabling a communication call, disabling the wireless device, disabling a specific application, enabling the wireless device, changing an operational state of the wireless device, determining a geographic position, capturing a still image, capturing a moving image, capturing audio, enabling a sensory alarm, reserving battery power, corrupting communication, deleting a first set of user data, retrieving a second set of user data, and locking access to a third set of user data.

9. The method of claim 1, wherein executing further comprises at least one of capturing a still image, capturing a moving image and capturing audio.

10. The method of claim 9, further comprising communicating at least one of the captured still image, the captured moving image and the captured audio to at least one of a network device, a service provider and a user of the targeted wireless communication device.

11. The method of claim 1, wherein executing further comprises changing a ring tone state from at least one of a silent state, a vibration state and a low volume state to at least one of an audible state and a high volume state.

12. The method of claim 1, wherein executing further comprises reserving battery power on the wireless device to accommodate power needed for additional location routines.

13. The method of claim 12, wherein reserving battery power on the wireless device further comprises at least one of entering a standby mode, entering a sleep mode and performing auto-shutoff.

14. The method of claim 12, further comprising using the reserved battery power in response to an event.

15. The method of claim 1, wherein executing further comprises deleting a first set of user data, and retrieving a second set of user data.

16. The method of claim 15, further comprising communicating the second set of user data to at least one of a network entity, a service provider and a user of the targeted wireless communication device.

17. The method of claim 15, wherein executing further comprises deleting the first set of user data from the targeted wireless communication device after communicating the second set of user data.

18. The method of claim 1, wherein executing further comprises enabling the one of the plurality of locating states corresponding to the locating state code, further comprising storing an indicator value of the locating state code in a non-volatile memory location on the targeted wireless device, checking the non-volatile memory location when restoring power to the wireless device to determine the indicator value, and re-enabling the one of the plurality of locating states corresponding to the indicator value.

19. The method of claim 1, wherein executing the one or more routines further comprises executing one or more routines that are running in a silent mode prior to receipt of the formatted communication data packet.

20. The method of claim 1, wherein executing further comprises corrupting communication, by the targeted wireless communication device, by scrambling at least one of voice communication and data communication.

21. The method of claim 1, wherein receiving, at the targeted wireless communication device, a communication data packet further comprises receiving, at the targeted wireless communication device, a communication data packet that is internally communicated from within the wireless communication device.

22. At least one processor, associated with a targeted wireless communication device, configured for locating the targeted wireless communication device, comprising:
  a first module for receiving, at the targeted wireless communication device, a communication data packet having a format comprising a locating state code associated with one of a plurality of locating states in which the targeted wireless device is operable, wherein each locating state is stored in a memory on the targeted wireless device and comprises one or more location routines carried out by the targeted wireless device; and
  a second module for executing at least one of the one or more location routines on the targeted wireless communication device in response to detecting the locating state code in the communication data packet, wherein the second module for executing further comprises a module for operating the wireless device in a stealth mode that disables output by the wireless device of user-perceptible indicators generated during execution of the one or more location routines in a non-stealth mode.

23. A computer program product, associated with a targeted wireless communication device, for locating the targeted wireless communication device, comprising:
  a computer-readable medium comprising:
  a first set of codes for causing a computer to receive a communication data packet having a format comprising a locating state code associated with one of a plurality of locating states in which the targeted wireless device is operable, wherein each locating state is stored in a memory on the targeted wireless device and comprises one or more location routines carried out by the targeted wireless device; and
  a second set of codes for causing the computer to execute at least one of the one or more location routines on the targeted wireless communication device in response to detecting the locating state code in the communication data packet, wherein the codes for causing the computer to execute further comprises code for causing the computer to operate the wireless device in a stealth mode that disables output by the wireless device of user-perceptible indicators generated during execution of the one or more location routines in a non-stealth mode.

24. An apparatus, comprising:
  means for receiving, at a targeted wireless communication device, a communication data packet having a format comprising a locating state code associated with one of a plurality of locating states in which the targeted wireless device is operable, wherein each locating state is stored in a memory on the targeted wireless device and comprises one or more location routines carried out by the targeted wireless device; and means for executing at least one of the one or more location routines on the targeted wireless communication device in response to detecting the locating state code in the communication data packet, wherein means for executing further comprises means for operating the wireless device in a stealth mode that disables output by the wireless device of user-perceptible indicators generated during execution of the one or more location routines in a non-stealth mode.

25. A wireless communication device, comprising:
a computer platform including a processor and a memory;
a communication module stored in the memory and executable by the processor, wherein the communication module is operable to receive a communication data packet having a format comprising a locating state code, wherein the locating state code is associated with one of a plurality of locating states in which the wireless communication device is operable; and
a location/recovery module for assisting in determining a location or recovering of the wireless communication device, the location/recovery module stored in the memory and executable by the processor to operate the wireless communication device in at least one of a plurality of locating states, wherein the location/recovery module further comprises a plurality of location routines each corresponding to at least one of the plurality of locating states, and wherein the location/recovery module is operable to initiate execution of one or more of the plurality of location routines based on recognition of the locating state code in the communication data packet, and wherein the location/recovery module is further operable to operate the wireless device in a stealth mode that disables output by the wireless device of user-perceptible indicators generated during execution of the one or more location routines in a non-stealth mode.

26. The device of claim 25, wherein the location/recovery module is further operable to communicate results of the execution of the one or more of the plurality of location routines to at least one of a network entity, a service provider and a user of the targeted wireless communication device.

27. The device of claim 25, wherein the location/recovery module is further operable to trigger the wireless device to perform a sequence of routines associated with the one or more location routines and corresponding to the one of a plurality of locating states associated with the locating state code.

28. The device of claim 25, wherein the communication module is further operable to receive a communication data packet corresponding to one of a data call or a voice call.

29. The device of claim 25, wherein the communication module further comprises a Short Message Service (SMS) communication module.

30. The device of claim 25, wherein the communication module is further operable to receive a communication data packet that includes a variable length field for setting parameters associated with the one or more routines.

31. The device of claim 25, wherein the location/recovery module that is operable to operate the wireless communication device in at least one of a plurality of locating states further defines the plurality of locating states as chosen from the group consisting of a misplaced state, a lost state, a stolen state, a tracking state, an emergency surveillance state and a covert surveillance state.

32. The device of claim 25, wherein the location/recovery module comprises the plurality of location routines each corresponding to at least one of the plurality of locating states and further defines the location routines as chosen from the group consisting of disabling a keypad, disabling a communication call, disabling the wireless device, enabling the wireless device, changing an operational state of the wireless device, disabling a specific application, determining a geographic position, capturing a still image, capturing a moving image, capturing audio, enabling a sensory alarm, reserving battery power, corrupting communication, deleting a first set of user data, retrieving a second set of user data, and locking access to a third set of user data.

33. The device of claim 25, wherein the location/recovery module includes the plurality of location routines including at least one of a still image capture routine, a moving image capture routine and an audio capture routine and the location/recovery module is further operable to initiate execution of one or more of the still image capture routine, the moving image capture routine and the audio capture routine based on recognition of the locating state code in the communication data packet.

34. The device of claim 33, wherein the location/recovery module is further operable to communicate data captured by the at least one of the still image capture routine, the moving image capture routine and the audio capture routine to at least one of a network device, a service provider and a user of the device.

35. The device of claim 25, wherein the location/recovery module includes the plurality of location routines including a ring state change routine operable to change a ring tone state from at least one of a silent state, a vibration state and a low volume state to at least one of an audible state and a high volume state.

36. The device of claim 25, wherein the location/recovery module includes the plurality of location routines including a battery power reserve routine operable to reserve battery power for other ones of the plurality of location routines.

37. The device of claim 36, wherein the battery power reserve routine is further operable to reserve battery power by providing for the device to execute at least one of a standby mode, a sleep mode or an auto-shutoff routine.

38. The device of claim 36, wherein the battery power reserve routine is further operable to use the reserved battery power in response to an event.

39. The device of claim 25, wherein the location/recovery module includes the plurality of location routines including a user data retrieval routine and a user data deletion routine.

40. The device of claim 39, wherein the location/recovery module is further operable to communicate retrieved user data to at least one of a network device, a service provider and a user of the device and delete the user data from the targeted wireless communication device.

41. The device of claim 25, wherein the location/recovery module is further operable to store an indicator value of the locating state code in a non-volatile memory location on the targeted wireless device, check the non-volatile memory location when restoring power to the wireless device to determine the indicator value, and re-enable the one of the plurality of locating states corresponding to the indicator value.

42. The device of claim 25, wherein the location/recovery module is further operable to execute one or more routines that are running in a silent mode prior to receipt of the communication data packet.

43. The device of claim 25, wherein the location/recovery module includes the plurality of routines including a communication corruption routine operable to corrupt the wireless device communication by scrambling at least one of voice communication and data communication.

44. The device of claim 25, wherein the communication module is further operable to internally receive the communication data packet.

45. The device of claim 25, further comprising a back-up power source that is implemented by one or more of the location routines.

46. A method for locating a targeted wireless communication device, the method comprising:
generating a communication data packet having a format comprising a locating state code associated with one of a plurality of locating states in which a targeted wireless communication device is operable and wherein each locating state is associated with one or more location routines operable on the targeted wireless communication device, wherein generating a communication data packet further comprises generating a Short Message Service (SMS) communication data packet that includes a payload having a location/recovery identifier operable to invoke a location/recovery mode on the targeted wireless communication device, a personal identifier operable to identify a generating party as an authorized party, a code associated with one of the plurality of locating states and a variable length field operable to set parameters associated with the one or more location routines; and
communicating the communication data packet to the targeted wireless communication device.

47. The method of claim 46, further comprising receiving, from the targeted wireless communication device, results of execution of the one or more location routines that are executed on the targeted wireless communication device in response to the targeted wireless communication device detecting the locating state code in the communication data packet.

48. The method of claim 46, wherein generating further comprises generating a communication data packet having a format that includes the locating state code associated with one of the plurality of locating states, wherein at least one locating state is associated with a sequence of routines that trigger the targeted wireless communication device to perform the sequence of routines, wherein the sequence of routines are derived from the one or more location routines operable on the targeted wireless communication device.

49. The method of claim 46, wherein generating a communication data packet further comprises generating a communication data packet corresponding to at least one of a data call or a voice call.

50. The method of claim 46, wherein generating a SMS communication data packet further comprises generating a SMS communication data packet that includes a variable length field for setting parameters associated with the one or more location routines.

51. The method of claim 46, wherein the one of the plurality of locating states is chosen from a group of locating states consisting of a misplaced state, a lost state, a stolen state, a tracking state, an emergency surveillance state and a covert surveillance state.

52. The method of claim 46, wherein each locating state of the plurality of locating states is associated with one or more location routines chosen from a group consisting of disabling a keypad, disabling a communication call, disabling the wireless device, enabling the wireless device, changing an operational state of the wireless device, disabling a specific application, determining a geographic position, capturing a still image, capturing a moving image, capturing audio, enabling a sensory alarm, reserving battery power, deleting a first set of user data, retrieving a second set of user data, and locking access to a third set of user data.

53. The method of claim 46, wherein generating a communication data packet of a format further comprises generating the communication data packet at a communication device chosen from the group consisting of a secondary wireless communication device, a network entity device associated with a web interface and a service provider device.

54. The method of claim 46, wherein one of the one or more location routines comprises at least one of an image capture routine, a capture routine and an audio capture routine.

55. The method of claim 54, further comprising receiving data captured by at least one of the image capture routine, the video capture routine or the audio capture routine, wherein the data is received from the targeted wireless communication device by at least one of a network device, a service provider entity or a secondary wireless communication device associated with a user of the targeted wireless communication device.

56. The method of claim 46, wherein one of the one or more location routines comprises a user data retrieval routine and a user data deletion routine.

57. The method of claim 56, further comprising receiving data captured by the user data retrieval routine, wherein the data is received from the targeted wireless communication device by at least one of a network device, a service provider entity or a secondary wireless communication device associated with a user of the targeted wireless communication device.

58. At least one processor associated with a device configured for locating a targeted wireless communication device, comprising:
a first module for generating a communication data packet having a format comprising a locating state code associated with one of a plurality of locating states in which the targeted wireless communication device is operable and wherein each locating state is associated with one or more location routines operable on the targeted wireless communication device, wherein generating a communication data packet further comprises generating a Short Message Service (SMS) communication data packet that includes a payload having a location/recovery identifier operable to invoke a location/recovery mode on the targeted wireless communication device, a personal identifier operable to identify a generating party as an authorized party, a code associated with one of the plurality of locating states and a variable length field operable to set parameters associated with the one or more location routines; and
a second module for communicating the communication data packet to the targeted wireless communication device.

59. A computer program product, comprising:
a computer-readable medium comprising:
a first set of codes for causing a computer to generate a communication data packet having a format comprising a locating state code associated with one of a plurality of locating states in which a targeted wireless communication device is operable and wherein each locating state is associated with one or more location routines operable on the targeted wireless communication device, wherein generating a communication data packet further comprises generating a Short Message Service (SMS) communication data packet that includes a payload having a location/recovery identifier operable to invoke a location/recovery mode on the targeted wireless communication device, a personal identifier operable to identify a generating party as an authorized party, a code associated with one of the plurality of locating states and a variable length field operable to set parameters associated with the one or more location routines; and a second set of codes for causing the computer to communicate the communication data packet to the targeted wireless communication device.

60. An apparatus, comprising:

means for generating a communication data packet having a format comprising a locating state code associated with one of a plurality of locating states in which a targeted wireless communication device is operable and wherein each locating state is associated with one or more location routines operable on the targeted wireless communication device, wherein generating a communication data packet further comprises generating a Short Message Service (SMS) communication data packet that includes a payload having a location/recovery identifier operable to invoke a location/recovery mode on the targeted wireless communication device, a personal identifier operable to identify a generating party as an authorized party, a code associated with one of the plurality of locating states and a variable length field operable to set parameters associated with the one or more location routines; and means for communicating the communication data packet to the targeted wireless communication device.

61. A. communication device, comprising:

a computer platform including a processor and a memory; and a communication module stored in the memory and executable by the processor, wherein the communication module is operable to generate a communication data packet having a format comprising a locating state code associated with one of a plurality of locating states in which a targeted wireless communication device is operable and wherein each locating state is associated with one or more location routines operable on the targeted wireless communication device and the communication module is further operable to wirelessly communicate the communication data packet to the targeted wireless communication device, wherein the communication module is further defined as a Short Message Service (SMS) communication module operable to generate a SMS communication data packet that includes a payload having a location/recovery identifier operable to invoke a location/recovery mode on the targeted wireless communication device, a personal identifier operable to identify a generating party as an authorized party, a locating state code associated with one of the plurality of locating states and a variable length field for setting parameters associated with the one or more location routines.

62. The device of claim 61, wherein the communication module is further operable to receive results of execution of the one or more location routines that are executed on the targeted wireless communication device in response to the targeted wireless communication device detecting the locating state code in the communication data packet.

63. The device of claim 61, wherein the communication module is further operable to generate a communication data packet having a format that includes a locating state code associated with one of the plurality of locating states, wherein at least one locating state of the plurality of locating states is associated with a sequence of routines associated with the one or more location routines and that trigger the targeted wireless communication device to perform the sequence of routines.

64. The device of claim 61, wherein the communication module is further operable to generate a communication data packet corresponding to one of a data call or a voice call.

65. The device of claim 61, wherein the SMS communication module is further operable to generate a SMS communication data packet that includes a variable length field for setting parameters associated with the one or more location routines.

66. The device of claim 61, Wherein the communication module is further operable to generate a communication data packet having a format that includes a locating state code associated with one of the plurality of locating states chosen from a group of locating states consisting of a misplaced state, a lost state, a stolen state, a tracking state, an emergency surveillance state and a covert surveillance state.

67. The device of claim 61, wherein each locating state of the plurality of locating states is associated with at least one of the one or more location routines, and wherein the at least one of the one or more location routines is chosen from a group consisting of disabling a keypad, disabling a communication call, disabling the wireless device, enabling the wireless device, changing an operational state of the wireless device, disabling a specific application, determining a geographic position, capturing a still image, capturing a moving image, capturing audio, enabling a sensory alarm, reserving battery power, deleting a first set of user data, retrieving a second set of user data, and locking access to a third set of user data.

68. The device of claim 61, wherein the communication device further comprises a communication device chosen from the group consisting of a secondary wireless communication device associated with a user of the targeted wireless communication device, a network entity device associated with a web interface and a service provider device.

69. The device of claim 61, wherein the device is chosen from the group consisting of a service provider network device, a wireless communication device, an Internet network device, and a law enforcement network device.

70. A method for locating a targeted wireless communication device, the method comprising:

receiving, at the targeted wireless communication device, a communication data packet having a format comprising a locating state code associated with one of a plurality of locating states in which the targeted wireless device is operable, wherein each locating state is stored in a memory on the targeted wireless communication device and comprises one or more location routines carried out by the targeted wireless device; and executing at least one of the one or more location routines on the targeted wireless communication device in response to detecting the locating state code in the communication data packet, wherein executing further comprises corrupting communication, by the targeted wireless communication device, by scrambling at least one of voice communication and data communication.

71. The method of claim 70, further comprising communicating a result of the execution of at least the one or more routines to at least one of a network entity, a service provider and a user of the targeted wireless communication device.

72. The method of claim 70, wherein receiving the communication data packet further comprises triggering the wireless device to perform a sequence of routines associated with the one or more location routines and corresponding to the one of a plurality of locating states associated with the locating state code.

73. The method of claim 70, wherein receiving the communication data packet further comprises receiving a communication data packet corresponding to one of a data call or a voice call.

74. The method of claim 70, wherein receiving the communication data packet further comprises receiving a Short Message Service (SMS) communication data packet.

75. The method of claim 74, wherein the SMS communication data packet further comprises receiving a variable length field for setting parameters associated with the one or more routines.

76. The method of claim 70, wherein executing further comprises enabling one of a misplaced state, a lost state, a stolen state, a tracking state, an emergency surveillance state and a covert surveillance state.

77. The method of claim 70, wherein executing further comprises at least one of disabling a keypad, disabling a communication call, disabling the wireless device, disabling a specific application, enabling the wireless device, changing an operational state of the wireless device, determining a geographic position, capturing a still image, capturing a moving image, capturing audio, enabling a sensory alarm, reserving battery power, corrupting communication, deleting a first set of user data, retrieving a second set of user data, and locking access to a third set of user data.

78. The method of claim 70, wherein executing further comprises at least one of capturing a still image, capturing a moving image and capturing audio.

79. The method of claim 78, further comprising communicating at least one of the captured still image, the captured moving image and the captured audio to at least one of a network device, a service provider and a user of the targeted wireless communication device.

80. The method of claim 70, wherein executing further comprises changing a ring tone state from at least one of a silent state, a vibration state and a low volume state to at least one of an audible state and a high volume state.

81. The method of claim 70, wherein executing further comprises reserving battery power on the wireless device to accommodate power needed for additional location routines.

82. The method of claim 81, wherein reserving battery power on the wireless device further comprises at least one of entering a standby mode, entering a sleep mode and performing auto-shutoff.

83. The method of claim 81, further comprising using the reserved battery power in response to an event.

84. The method of claim 70, wherein executing further comprises deleting a first set of user data, and retrieving a second set of user data.

85. The method of claim 84, further comprising communicating the second set of user data to at least one of a network entity, a service provider and a user of the targeted wireless communication device.

86. The method of claim 84, wherein executing further comprises deleting the first set of user data from the targeted wireless communication device after communicating the second set of user data.

87. The method of claim 70, wherein executing further comprises enabling the one of the plurality of locating states corresponding to the locating state code, further comprising storing an indicator value of the locating state code in a non-volatile memory location on the targeted wireless device, checking the non-volatile memory location when restoring power to the wireless device to determine the indicator value, and re-enabling the one of the plurality of locating states corresponding to the indicator value.

88. The method of claim 70, wherein executing the one or more routines further comprises executing one or more routines that are running in a silent mode prior to receipt of the formatted communication data packet.

89. The method of claim 70, wherein receiving, at the targeted wireless communication device, a communication data packet further comprises receiving, at the targeted wireless communication device, a communication data packet that is internally communicated from within the wireless communication device.

90. At least one processor, associated with a targeted wireless communication device, configured for locating the targeted wireless communication device, comprising:
a first module for receiving, at the targeted wireless communication device, a communication data packet having a format comprising a locating state code associated with one of a plurality of locating states in which the targeted wireless device is operable, wherein each locating state is stored in a memory on the targeted wireless device and comprises one or more location routines carried out by the targeted wireless device; and
a second module for executing at least one of the one or more location routines on the targeted wireless communication device in response to detecting the locating state code in the communication data packet, wherein executing further comprises corrupting communication, by the targeted wireless communication device, by scrambling at least one of voice communication and data communication.

91. A computer program product, associated with a targeted wireless communication device, for locating the targeted wireless communication device, comprising:
a computer-readable medium comprising:
a first set of codes for causing a computer to receive a communication data packet having a format comprising a locating state code associated with one of a plurality of locating states in which the targeted wireless device is operable, wherein each locating state is stored in a memory on the targeted wireless device and comprises one or more location routines carried out by the targeted wireless device; and
a second set of codes for causing the computer to execute at least one of the one or more location routines on the targeted wireless communication device in response to detecting the locating state code in the communication data packet, wherein executing further comprises corrupting communication, by the targeted wireless communication device, by scrambling at least one of voice communication and data communication.

92. An apparatus, comprising:
means for receiving, at a targeted wireless communication device, a communication data packet having a format comprising a locating state code associated with one of a plurality of locating states in which the targeted wireless device is operable, wherein each locating state is stored in a memory on the targeted wireless device and comprises one or more location routines carried out by the targeted wireless device; and
means for executing at least one of the one or more location routines on the targeted wireless communication device in response to detecting the locating state code in the communication data packet, wherein executing further comprises corrupting communication, by the targeted wireless communication device, by scrambling at least one of voice communication and data communication.

93. A wireless communication device, comprising:
a computer platform including a processor and a memory;

a communication module stored in the memory and executable by the processor, wherein the communication module is operable to receive a communication data packet having a format comprising a locating state code, wherein the locating state code is associated with one of a plurality of locating states in which the wireless communication device is operable; and a location/recovery module for assisting in determining a location or recovering of the wireless communication device, the location/recovery module stored in the memory and executable by the processor to operate the wireless communication device in at least one of a plurality of locating states, wherein the location/recovery module further comprises a plurality of location routines each corresponding to at least one of the plurality of locating states, and wherein the location/recovery module is operable to initiate execution of one or more of the plurality of location routines based on recognition of the locating state code in the communication data packet, wherein the location/recovery module includes the plurality of routines including a communication corruption routine operable to corrupt the wireless device communication by scrambling at least one of voice communication and data communication.

94. The device of claim 93, wherein the location/recovery module is further operable to communicate results of the execution of the one or more of the plurality of location routines to at least one of a network entity, a service provider and a user of the targeted wireless communication device.

95. The device of claim 93, wherein the location/recovery module is further operable to trigger the wireless device to perform a sequence of routines associated with the one or more location routines and corresponding to the one of a plurality of locating states associated with the locating state code.

96. The device of claim 93, wherein the communication module is further operable to receive a communication data packet corresponding to one of a data call or a voice call.

97. The device of claim 93, wherein the communication module further comprises a Short Message Service (SMS) communication module.

98. The device of claim 93, wherein the communication module is further operable to receive a communication data packet that includes a variable length field for setting parameters associated with the one or more routines.

99. The device of claim 93, wherein the location/recovery module that is operable to operate the wireless communication device in at least one of a plurality of locating states further defines the plurality of locating states as chosen from the group consisting of a misplaced state, a lost state, a stolen state, a tracking state, an emergency surveillance state and a covert surveillance state.

100. The device of claim 93, wherein the location/recovery module comprises the plurality of location routines each corresponding to at least one of the plurality of locating states and further defines the location routines as chosen from the group consisting of disabling a keypad, disabling a communication call, disabling the wireless device, enabling the wireless device, changing an operational state of the wireless device, disabling a specific application, determining a geographic position, capturing a still image, capturing a moving image, capturing audio, enabling a sensory alarm, reserving battery power, corrupting communication, deleting a first set of user data, retrieving a second set of user data, and locking access to a third set of user data.

101. The device of claim 93, wherein the location/recovery module includes the plurality of location routines including at least one of a still image capture routine, a moving image capture routine and an audio capture routine and the location/recovery module is further operable to initiate execution of one or more of the still image capture routine, the moving image capture routine and the audio capture routine based on recognition of the locating state code in the communication data packet.

102. The device of claim 101, wherein the location/recovery module is further operable to communicate data captured by the at least one of the still image capture routine, the moving image capture routine and the audio capture routine to at least one of a network device, a service provider and a user of the device.

103. The device of claim 93, wherein the location/recovery module includes the plurality of location routines including a ring state change routine operable to change a ring tone state from at least one of a silent state, a vibration state and a low volume state to at least one of an audible state and a high volume state.

104. The device of claim 93, wherein the location/recovery module includes the plurality of location routines including a battery power reserve routine operable to reserve battery power for other ones of the plurality of location routines.

105. The device of claim 104, wherein the battery power reserve routine is further operable to reserve battery power by providing for the device to execute at least one of a standby mode, a sleep mode or an auto-shutoff routine.

106. The device of claim 104, wherein the battery power reserve routine is further operable to use the reserved battery power in response to an event.

107. The device of claim 93, wherein the location/recovery module includes the plurality of location routines including a user data retrieval routine and a user data deletion routine.

108. The device of claim 107, wherein the location/recovery module is further operable to communicate retrieved user data to at least one of a network device, a service provider and a user of the device and delete the user data from the targeted wireless communication device.

109. The device of claim 93, wherein the location/recovery module is further operable to store an indicator value of the locating state code in a non-volatile memory location on the targeted wireless device, check the non-volatile memory location when restoring power to the wireless device to determine the indicator value, and re-enable the one of the plurality of locating states corresponding to the indicator value.

110. The device of claim 93, wherein the location/recovery module is further operable to execute one or more routines that are running in a silent mode prior to receipt of the communication data packet.

111. The device of claim 93, wherein the communication module is further operable to internally receive the communication data packet.

112. The device of claim 93, further comprising a back-up power source that is implemented by one or more of the location routines.

* * * * *